United States Patent
Yamaguchi et al.

(10) Patent No.: US 8,874,936 B2
(45) Date of Patent: Oct. 28, 2014

(54) TERMINAL DEVICE, VERIFICATION DEVICE, KEY DISTRIBUTION DEVICE, CONTENT PLAYBACK METHOD, KEY DISTRIBUTION METHOD, AND RECORDING MEDIUM

(75) Inventors: Takahiro Yamaguchi, Osaka (JP); Yuichi Futa, Osaka (JP); Toshihisa Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 212 days.

(21) Appl. No.: 13/591,408

(22) Filed: Aug. 22, 2012

(65) Prior Publication Data

US 2013/0054971 A1 Feb. 28, 2013

Related U.S. Application Data

(60) Provisional application No. 61/527,854, filed on Aug. 26, 2011.

(51) Int. Cl.
*H04L 9/00* (2006.01)
*G06F 21/62* (2013.01)
*H04L 9/32* (2006.01)

(52) U.S. Cl.
CPC .......... *G06F 21/6209* (2013.01); *H04L 9/3247* (2013.01)
USPC .............. 713/193; 713/194; 713/171; 726/30

(58) Field of Classification Search
CPC ............................ G06F 21/6209; H04L 9/3247
USPC .......................................................... 713/193
See application file for complete search history.

(56) References Cited

U.S. PATENT DOCUMENTS

| 7,088,822 B2 * | 8/2006 | Asano ............................. 380/45 |
| 2010/0067873 A1 * | 3/2010 | Sasaki et al. .................... 386/95 |
| 2010/0122079 A1 | 5/2010 | Nakano et al. |

FOREIGN PATENT DOCUMENTS

| JP | 4084827 | 4/2008 |
| JP | 4268673 | 5/2009 |
| WO | 2005/096119 | 10/2005 |

OTHER PUBLICATIONS

"Advanced Access Content System (AACS)", Prepared Video Book, Revision 0.95, Final, Feb. 19, 2009, pp. 1-33.

* cited by examiner

*Primary Examiner* — Longbit Chai
(74) *Attorney, Agent, or Firm* — Wenderoth, Lind & Ponack, L.L.P.

(57) ABSTRACT

The terminal device 600 comprises: a read unit configured to read encrypted content and a content signature from a regular region of a recording medium device 700, and to read a converted title key from an authorized region of the recording medium device 700, the converted title key having been converted from a title key with use of a content signature generated by an authorized signature device 500; a title key reconstruction unit configured to generate a reconstructed title key by reversely converting the converted title key with use of the content signature read by the read unit; and a playback unit configured to decrypt the encrypted content with use of the reconstructed title key to obtain decrypted content, and to play back the decrypted content.

15 Claims, 26 Drawing Sheets

TERMINAL DEVICE, VERIFICATION DEVICE, KEY DISTRIBUTION DEVICE, CONTENT PLAYBACK METHOD, KEY DISTRIBUTION METHOD, AND RECORDING MEDIUM

This application claims benefit to the provisional U.S. Application 61/527,854, filed on Aug. 26, 2011.

TECHNICAL FIELD

The present disclosure relates to a technique for recording a digital work distributed via a network into a recording medium device, and playing back the digital work recorded in the recording medium device.

DESCRIPTION OF THE RELATED ART

In recent years, a content distribution system is becoming popular. In the content distribution system, a digital work (hereinafter "content") such as a movie or music is distributed via a network. For example, a personal computer (hereinafter "PC") of a user receives content from a content server, and records the content onto an SD memory card or the like purchased by the user.

Since content distributed via a network is digital data having high image quality and high sound quality, copyright protection measures are necessary to prevent unauthorized copy or the like from being distributed.

One of copyright protection standards for content is an Advanced Access Content System (AACS). The AACS is a copyright protection standard used in Blu-ray Discs (BD)™. One of copyright protection techniques defined by the AACS is "content signature" (Patent Literature 1).

A content creator creates a hash list including hash values of respective partial contents resulting from division of content, and transmits the hash list to a reliable third party authority. Upon receiving the hash list, the third party authority provides the hash list with a digital signature, and generates a content signature composed of the hash list and the digital signature. The content creator records the content and the content signature onto a BD, and sells the BD to a user. The content signature is generated by a secure signature device that is not connected to a network. Accordingly, the risk of a signature key being leaked is low, and for that reason the content signature is highly reliable.

During playback of content, an authorized playback device partially compares hash values calculated from the content and the hash list included in the content signature. Furthermore, the playback device verifies the digital signature included in the content signature. This makes it possible to check whether the content is authorized or whether the content is maliciously replaced with unauthorized content. If detecting that the content is unauthorized or maliciously replaced, the playback device stops playback of the content.

CITATION LIST

Patent Literature

[Patent Literature 1]
  Japanese Patent No. 4084827

SUMMARY

The use of the AACS has been recently considered as copyright protection measures for the content that is to be recorded onto a next generation SD memory card composed of a controller and a flash memory. In this case, a content signature is assumed to be generated by a content server.

However, unlike a signature device of an existing third party authority, the content server is connected to a network. This increases the risk of a signature key being leaked. If a signature key is leaked, the signature key may be used maliciously for malicious use of content.

Accordingly, one non-limiting and exemplary embodiment provides a terminal device, a verification device, a key distribution device, a content playback method, a key distribution method, and a recording medium having stored thereon a computer program that each prevent malicious use of content by maliciously using a leaked signature key, in a system in which content distributed via a network is recorded into a recording medium device such as an SD memory card.

In one general aspect, the techniques disclosed here feature a terminal device comprising: a read unit configured to read encrypted content and a content signature from a recording medium device, and to read a converted title key from a protected area of the recording medium device, the converted title key having been converted from a title key with use of a content signature generated by an authorized signature device; a title key reconstruction unit configured to generate a reconstructed title key by reversely converting the converted title key with use of the content signature read by the read unit; and a playback unit configured to decrypt the encrypted content with use of the reconstructed title key to obtain decrypted content, and to play back the decrypted content.

According to this structure, the converted title key is recorded in the protected area of the recording medium device. The converted title key is a title key converted with use of the content signature generated by the authorized signature device. Therefore, even if a malicious act is conducted whereby a content signature generated with use of a leaked signature key and unauthorized encrypted content are recorded into the recording medium device, the terminal device cannot reconstruct the correct title key from the converted title key read from the recording medium device. If the correct title key cannot be reconstructed, the terminal device cannot correctly decrypt the unauthorized encrypted content. This prevents the terminal device from playing back the unauthorized encrypted content, thus preventing malicious use of content.

These general and specific aspects may be implemented using a system, a method, and a computer program, and any combination of systems, methods, and computer programs.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

DETAILED DESCRIPTION

The following describes a content distribution system 1 as one aspect of the present disclosure.

<1. Outline>

Figure 1:
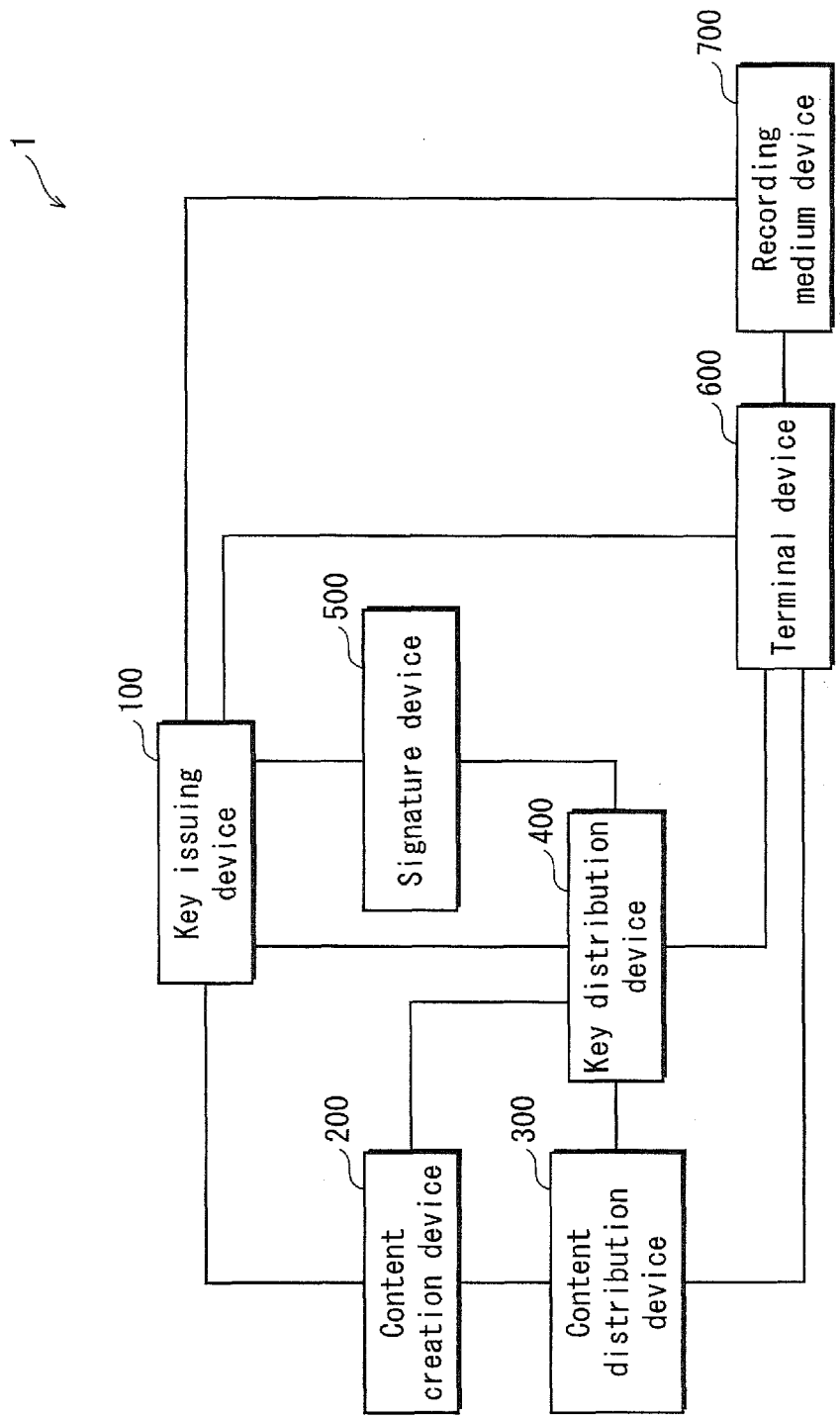
FIG. 1 shows the structure of a content distribution system 1.

FIG. 1 shows the overall structure of the content distribution system 1.

The content distribution system 1 includes a key issuing device 100, a content creation device 200, a content distribution device 300, a key distribution device 400, a signature device 500, a terminal device 600, and a recording medium device 700.

The key issuing device 100 is owned by an authorized authority which serves as a basis of security of the content distribution system 1. The key issuing device 100 generates and issues an authorized private key and an authorized public key certificate, for each of the devices in the content distribution system 1.

The content creation device 200 generates content and a usage condition of the content. The content creation device 200 transmits the generated content to the content distribution device 300, and transmits the generated usage condition to the key distribution device 400.

The content distribution device 300 generates a title key, encrypts the content with the title key, and thereby generates encrypted content. Furthermore, the content distribution device 300 generates content identification information based on the encrypted content. The content distribution device 300 transmits the title key and the content identification information thus generated to the key distribution device 400.

Upon receiving the content identification information, the key distribution device 400 transmits the content identification information to the signature device 500, together with a request for generating a content signature. The signature device 500 provides the content identification information with a signature with use of a signature key so as to generate a content signature, and transmits the content signature to the key distribution device 400.

The key distribution device 400 generates a calculated title key by performing a predetermined calculation on the title key received from the content distribution device 300, with use of the content signature received from the signature device 500 and the usage condition received from the content creation device 200. The key distribution device 400 transmits the calculated title key to the recording medium device 700, via the terminal device 600.

The terminal device 600 is, for example, a PC located at a user's home. The terminal device 600 is connectable to the content distribution device 300 and the key distribution device 400, via a network such as the Internet. Also, the recording medium device 700, which is an SD memory card or the like, is mountable in the terminal device 600.

The terminal device 600 receives the encrypted content from the content distribution device 300 via the network, and writes the encrypted content into the recording medium device 700 mounted therein. Also, the terminal device 600 receives information necessary for playback of the content, such as the calculated title key, the usage condition, the content signature, etc., from the key distribution device 400 via the network, and writes the information into the recording medium device 700. At this time, the calculated title key is written in a protected region (i.e., protected area) of the recording medium device 700. Data written in the "protected region" can be read by an external device; however, the data cannot be rewritten.

Also, the terminal device 600 plays back content recorded in the recording medium device 700. At this time, the terminal device 600 reconstructs a title key from the calculated title key, with use of the content signature and the usage condition recorded in the recording medium device 700. Then, the terminal device 600 decrypts the encrypted content with use of the reconstructed title key, and plays back the resultant content.

Here, in the case where the signature key held by the signature device 500 is leaked, a malicious act may be conducted whereby the leaked signature key is used for unauthorized encrypted content to generate a content signature, and the unauthorized encrypted content pretending to be authorized content with the content signature is recorded into the recording medium device 700.

However, as described above, the protected region of the recording medium device 700 stores therein the calculated title key, which is obtained by calculating the title key with use of the content signature already generated by the signature device 500 and the usage condition.

Accordingly, even if a content signature is generated with use of the leaked signature key, and unauthorized encrypted content pretending to be authorized content is recorded into the recording medium device 700, the terminal device 600 cannot reconstruct an authorized title key from the calculated title key. This enables preventing playback of the unauthorized encrypted content.

The following describes in detail the structure of each device and processing performed by each device.

<2. Key Issuing Device 100>

The following describes the key issuing device 100 in detail. The key issuing device 100 performs key issuing processing. In this processing, the key issuing device 100 issues an authorized private key and an authorized public key certificate, for each of the devices in the content distribution system 1, and also issues a revocation list including an ID of a device whose private key has been leaked.

<2-1. Structure of Key Issuing Device 100>

Figure 2:
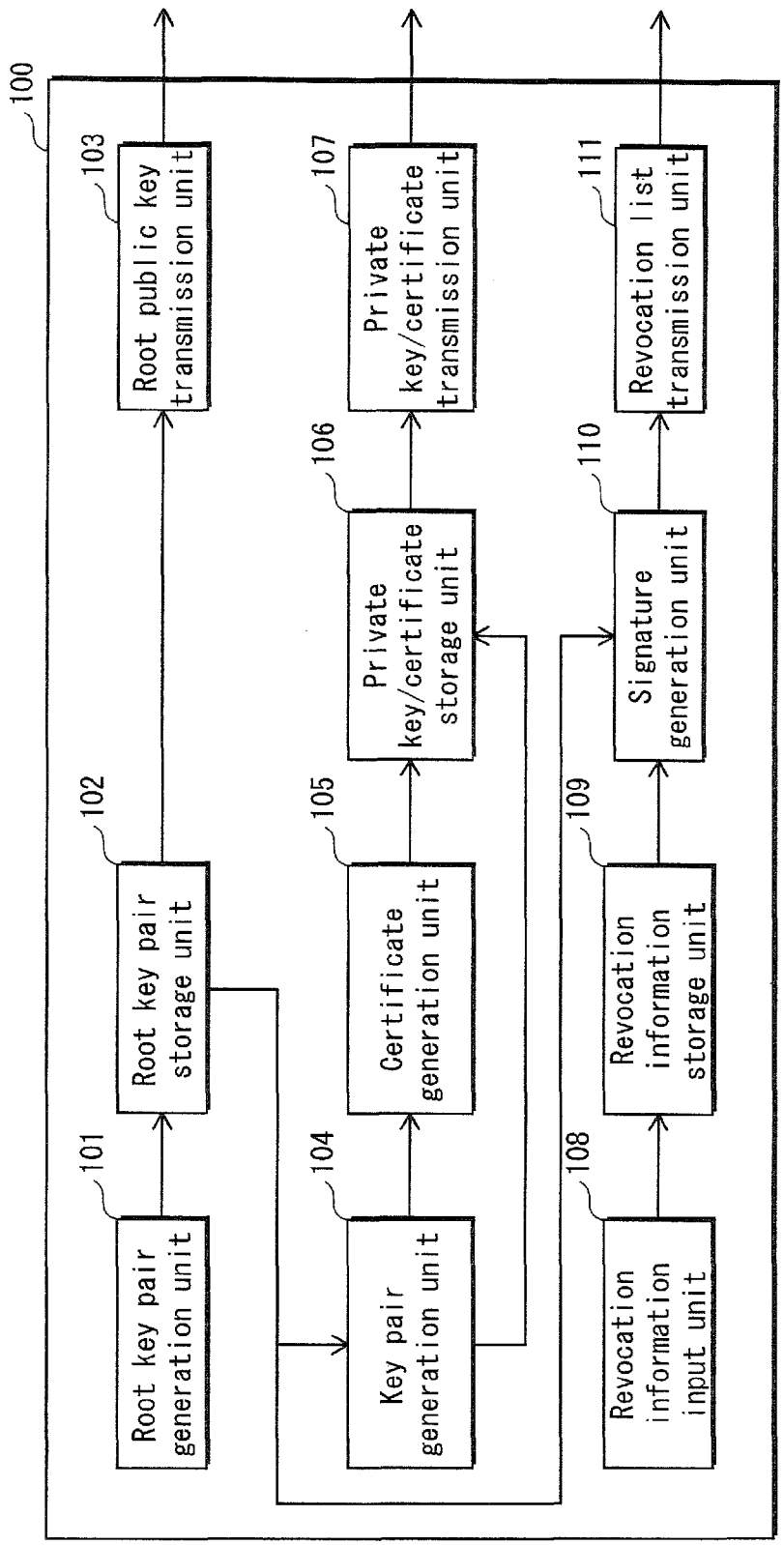
FIG. 2 is a block diagram showing a key issuing device 100.

FIG. 2 is a block diagram showing a functional structure of the key issuing device 100. As shown in FIG. 2, the key issuing device 100 includes a root key pair generation unit 101, a root key pair storage unit 102, a root public key transmission unit 103, a key pair generation unit 104, a certificate generation unit 105, a private key/certificate storage unit 106, a private key/certificate transmission unit 107, a revocation information input unit 108, a revocation information storage unit 109, a signature generation unit 110, and a revocation list transmission unit 111.

The key issuing device 100 includes a processor, a RAM (Random Access Memory), a ROM (Read Only Memory), and a hard disk that are not shown. Also, each function block of the key issuing device 100 is realized by hardware or by the processor executing a computer program stored in the ROM or the hard disk.

The root key pair generation unit 101 generates a root key pair for the key issuing device 100, which is the security core in the content distribution system 1. The root key pair is composed of a root public key and a root private key. The root key pair storage unit 102 stores therein the root key pair generated by the root key pair generation unit 101.

The root public key transmission unit 103 transmits the root public key stored in the root key pair storage unit 102, to the key distribution device 400, the terminal device 600, and the recording medium device 700. The root public key is used when the key distribution device 400, the terminal device 600, and the recording medium device 700 verify a signature generated by the key issuing device 100.

The key pair generation unit 104 generates a key pair for each of the key distribution device 400, the signature device 500, the terminal device 600, and the recording medium device 700.

Specifically, the key pair generation unit 104 generates a key distribution device key pair of a key distribution device public key and a key distribution device private key to be embedded in the key distribution device 400. Also, the key pair generation unit 104 generates a signature device key pair of a signature device public key and a signature device private key to be embedded in the signature device 500. Also, the key pair generation unit 104 generates a terminal device key pair of a terminal device public key and a terminal device private key to be embedded in the terminal device 600. Also, the key pair generation unit 104 generates a recording medium device key pair of a recording medium device public key and a recording medium device private key to be embedded in the recording medium device 700.

The certificate generation unit 105 generates a public key certificate to be embedded in each of the key distribution device 400, the signature device 500, the terminal device 600, and the recording medium device 700.

FIG. 3A to 3D each show an example of the public key certificate generated by the certificate generation unit 105.

Figure 3A:
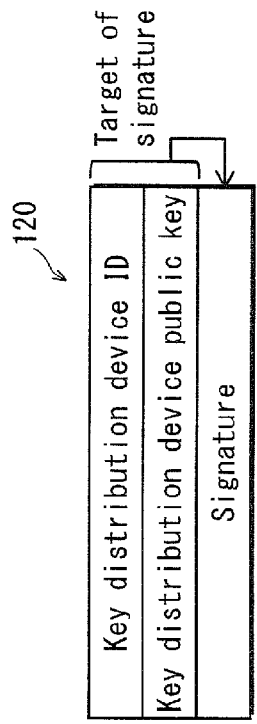
FIGS. 3A to 3D each show the data structure of a certificate generated by the key issuing device 100.

FIG. 3A shows a key distribution device certificate 120 distributed to the key distribution device 400. The key distribution device certificate 120 is composed of a key distribution device ID, a key distribution device public key, and a signature. The key distribution device certificate 120 is generated as follows. First, the certificate generation unit 105 adds the key distribution device public key generated by the key pair generation unit 104 to the key distribution device ID that is an identifier of the key distribution device 400, and treats the resultant data as signature target data. The certificate generation unit 105 generates a signature by applying a signature verification algorithm to the signature target data, with use of the root private key as a signature generation key. Then, the certificate generation unit 105 generates the key distribution device certificate 120 composed of the key distribution device ID, the key distribution device public key, and the signature.

Figure 3B:
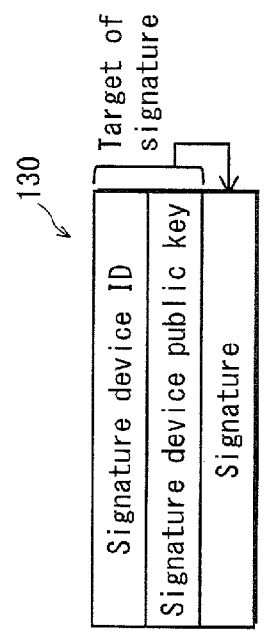
Figure 3C:
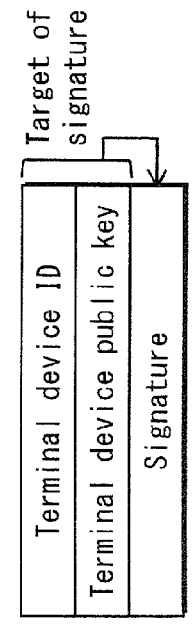
Figure 3D:
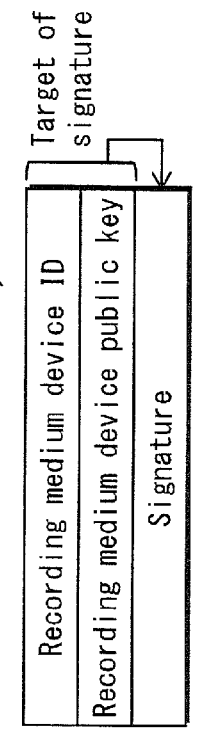

FIG. 3B shows a signature device certificate 130 distributed to the signature device 500. FIG. 3C shows a terminal device certificate 140 distributed to the terminal device 600. FIG. 3D is a recording medium device certificate 150 distributed to the recording medium device 700. These public key certificates are generated similarly to the key distribution device certificate 120.

The private key/certificate storage unit 106 stores therein, as pairs, (i) the private keys of the respective devices that are generated by the key pair generation unit 104 and (ii) the public key certificates of the respective devices that are generated by the certificate generation unit 105.

The private key/certificate transmission unit 107 transmits, to each device, a corresponding one of the pairs of the private keys and the public key certificates stored in the private key/certificate storage unit 106. Specifically, the private key/certificate transmission unit 107 transmits the key distribution device certificate 120 to the key distribution device 400, the signature device certificate 130 to the signature device 500, the terminal device certificate 140 to the terminal device 600, and the recording medium device certificate 150 to the recording medium device 700.

The revocation information input unit 108 receives an input of the ID of a device corresponding to a private key that is leaked and maliciously used. Specifically, when it is confirmed that a private key is leaked from a device that has received the private key and the corresponding certificate from the key issuing device 100, and that the private key is maliciously used, the revocation information input unit 108 receives an input of the ID of the device. Also, the revocation information input unit 108 receives an input of the date on which the malicious use of the private key was confirmed.

The revocation information storage unit 109 accumulates revocation information pieces each indicating a pair of a device ID and a date input by the revocation information input unit 108.

The signature generation unit 110 generates a list including the plurality of revocation information pieces stored in the revocation information storage unit 109, applies a signature generation algorithm to the generated list with use of the root private key stored in the root key pair storage unit 102 as a signature generation key, and thereby generates a signature. The signature generation unit 110 generates a revocation list by providing the list with the signature.

Figure 4:
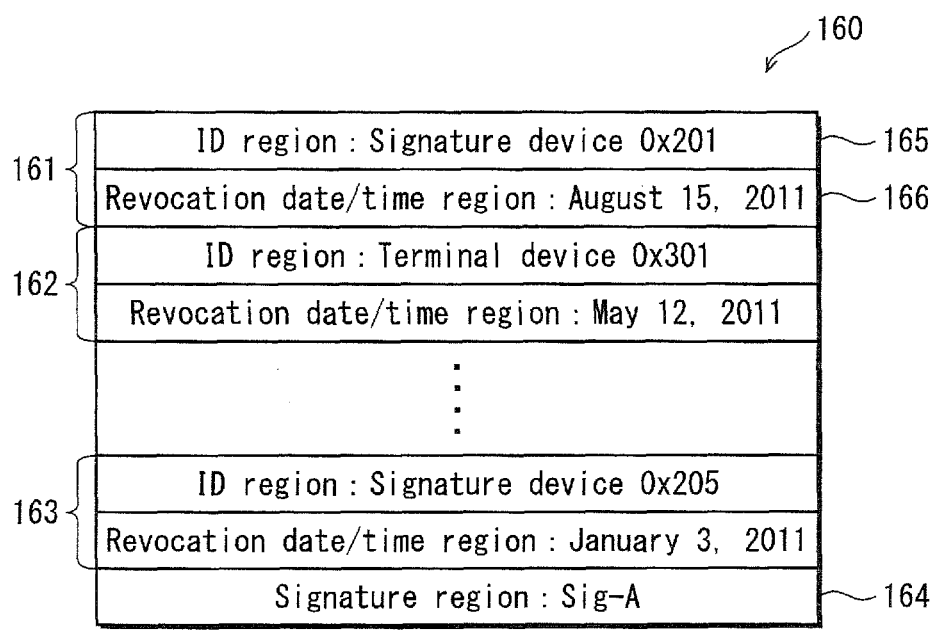
FIG. 4 shows the data structure of a revocation list 160 generated by the key issuing device 100.

FIG. 4 shows an example of the revocation list. As shown in FIG. 4, a revocation list 160 is composed of revocation information regions 161, 162, ..., 163, and a signature region 164. Each revocation information region is composed of an ID region and a revocation date/time region. For example, within the revocation information region 161, an ID region 165 indicates an ID "0x201", which is the ID of a revoked signature device, and a revocation date/time region 166 indicates "Aug. 15, 2011", which is the date on which the signature device was revoked. In the present embodiment, the revocation list includes the revocation date/time regions. In this way, a private key can be revoked only after the malicious use of the private key is confirmed. When a leak and malicious use of a private key is confirmed, a revocation information piece is newly added to the revocation list, whereby the revocation list is updated.

The revocation list transmission unit 111 transmits the revocation list generated by the signature generation unit 110 to the key distribution device 400 and the terminal device 600.

<2-2. Operation of Key Issuing Processing>

Figure 5:
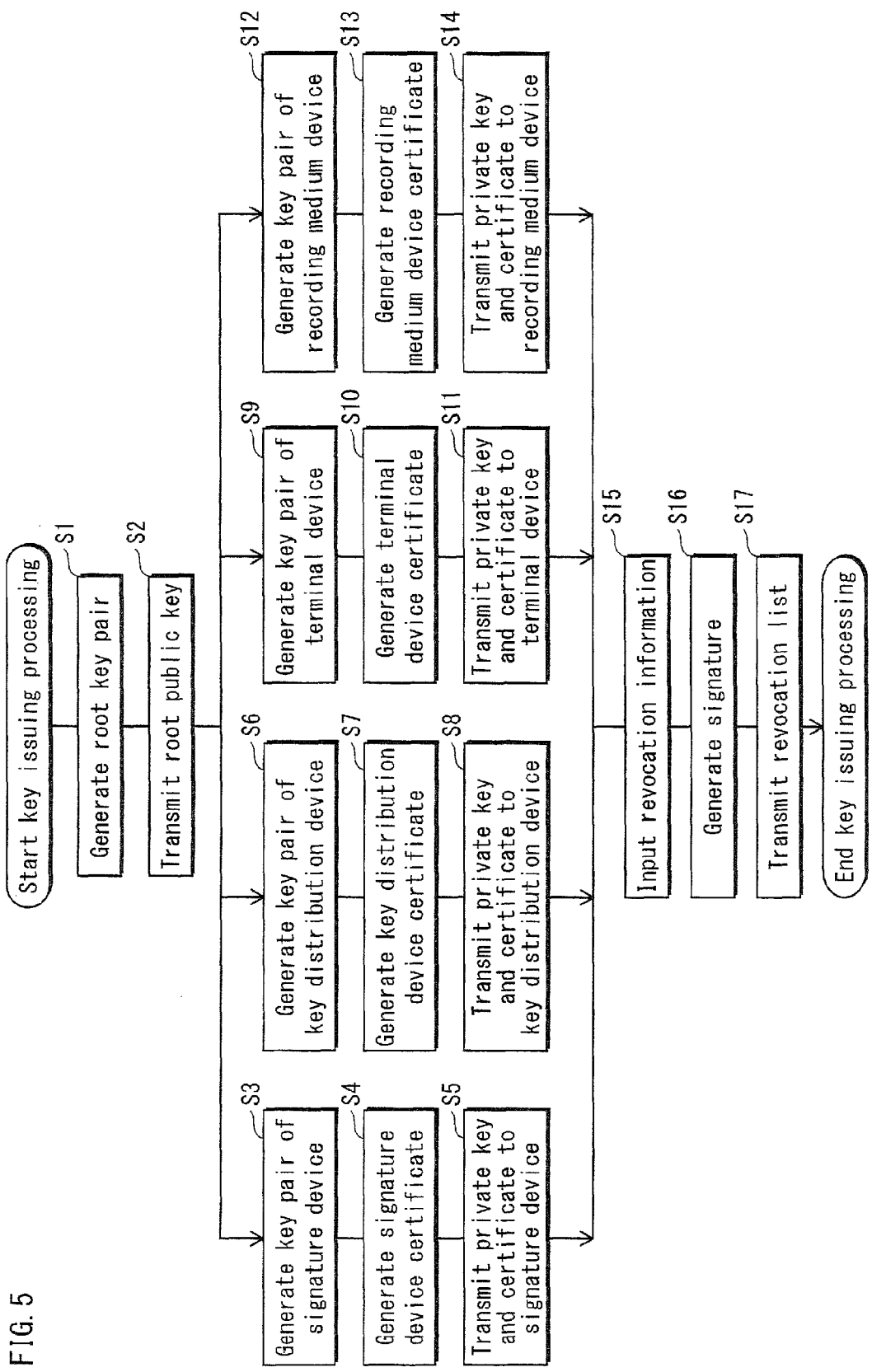
FIG. 5 is a flowchart showing operations of key issuing processing.

FIG. 5 is a flowchart showing operations of the key issuing processing by the key issuing device 100.

The key issuing device 100 generates a root key pair consisting of the root public key and the root private key (step S1), and stores the root key pair into the root key pair storage unit 102. The root public key transmission unit 103 transmits the root public key to the key distribution device 400, the terminal device 600, and the recording medium device 700 (step S2).

The key pair generation unit 104 generates the key pair of the signature device 500 (step S3). The certificate generation unit 105 generates the signature device certificate 130 (step S4). The private key/certificate transmission unit 107 transmits the signature device private key and the signature device certificate 130 to the signature device 500 (step S5).

The key pair generation unit 104 generates the key pair of the key distribution device 400 (step S6). The certificate generation unit 105 generates the key distribution device certificate 120 (step S7). The private key/certificate transmission unit 107 transmits the key distribution device private key and the key distribution device certificate 120 to the key distribution device 400 (step S8).

The key pair generation unit 104 generates the key pair of the terminal device 600 (step S9). The certificate generation unit 105 generates the terminal device certificate 140 (step S10). The private key/certificate transmission unit 107 transmits the terminal device private key and the terminal device certificate 140 to a device that manufactures the terminal device 600 (step S11).

The key pair generation unit 104 generates the key pair of the recording medium device 700 (step S12). The certificate generation unit 105 generates the recording medium device certificate 150 (step S13). The private key/certificate transmission unit 107 transmits the recording medium device private key and the recording medium device certificate 150 to a device that manufactures the recording medium device 700 (step S14).

The revocation information input unit 108 receives an input of a revocation information piece (i.e., device ID and revocation date and time) (step S15).

The signature generation unit 110 generates, with use of the root private key, a signature for a list including a plurality of revocation information pieces (step S16), and generates a revocation list by providing the list with the signature. The revocation list transmission unit 111 transmits the revocation list thus generated to the key distribution device 400 and the terminal device 600.

<3. Content Creation Device 200>

The following describes the content creation device 200 in detail. The content creation device 200 performs content creation processing for generating and encrypting content.

<3-1. Structure of Content Creation Device 200>

Figure 6:
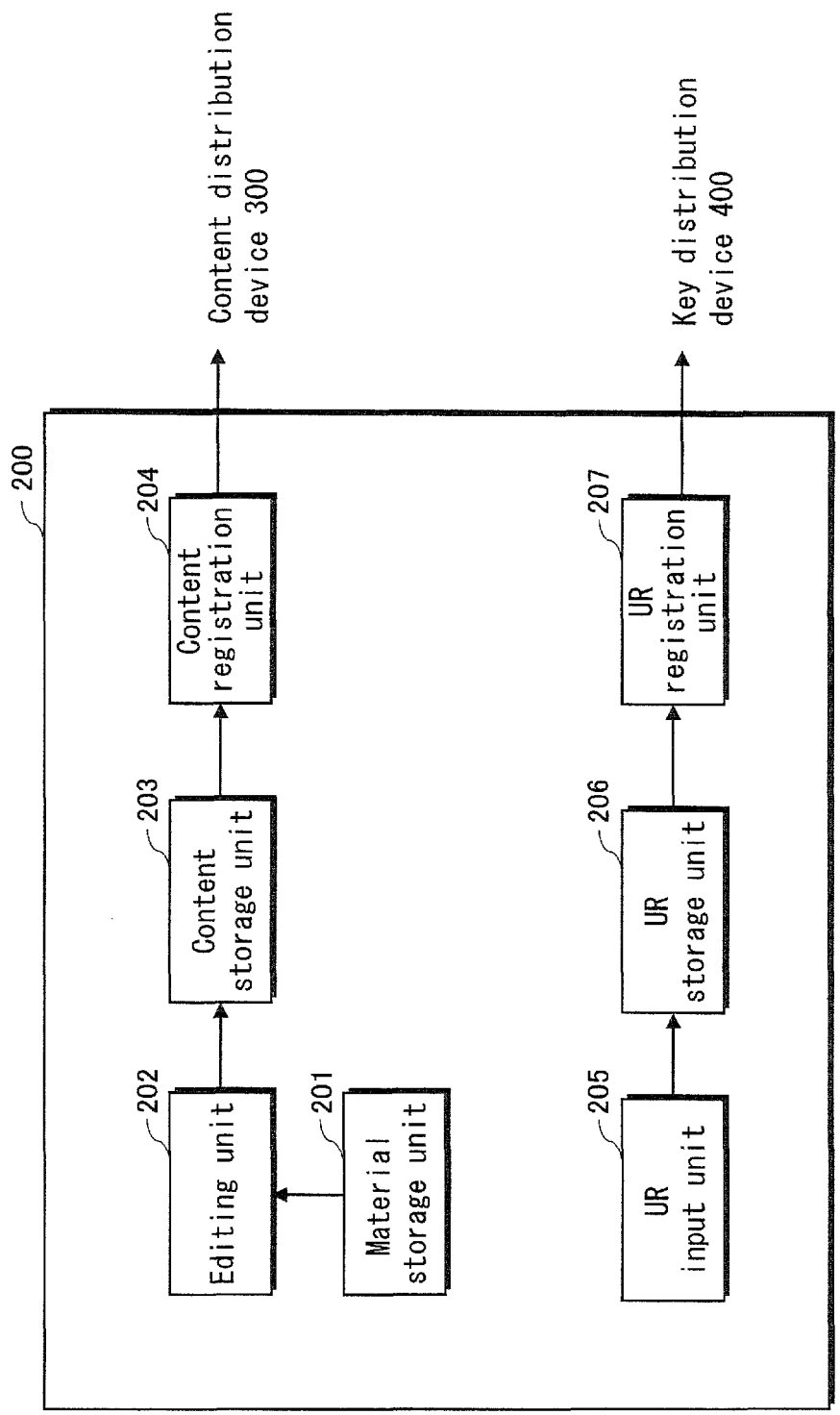
FIG. 6 is a block diagram showing a content creation device 200.

FIG. 6 is a block diagram showing the functional structure of the content creation device 200. As shown in FIG. 6, the content creation device 200 includes a material storage unit 201, an editing unit 202, a content storage unit 203, a content registration unit 204, a UR input unit 205, a UR storage unit 206, and a UR registration unit 207.

The content creation device 200 includes a processor, a RAM, a ROM, and a hard disk that are not shown. Also, each function block of the content creation device 200 is realized by hardware or by the processor executing a computer program stored in the ROM or the hard disk.

The material storage unit 201 stores therein a plurality of material data pieces (video data and audio data of movies or the like).

The editing unit 202 creates content such as a movie by combining the plurality of material data pieces stored in the material storage unit 201.

The content storage unit 203 stores therein the content created by the editing unit 202.

The content registration unit 204 registers the content stored in the content storage unit 203 with the content distribution device 300.

The UR input unit 205 includes input devices such as a keyboard and a mouse. The UR input unit 205 receives an input of a Usage Rule (hereinafter "UR") input by a content creator via the input devices. The UR is a condition related to the use of content, such as the number of times playback of the content is permitted or whether or not moving of the content is permitted.

The UR storage unit 206 stores therein the UR received by the UR input unit 205.

Figure 7:
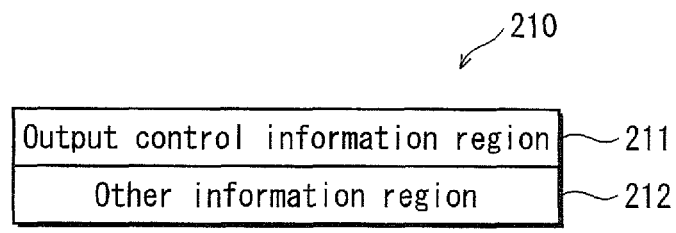
FIG. 7 shows the data structure of a UR 210.

FIG. 7 shows the data structure of the UR. As shown in FIG. 7, a UR 210 is composed of an output control information region 211 and an other information region 212. The output control information region 211 indicates control information relating to playback and moving of content. Examples of the control information include: a playable period during which playback is permitted; a playback start date and time; a playback end date and time; a playable count which is the number of times playback is permitted; analog output permission information; move permission information; and a movable count which is the number of times moving is permitted.

The other information region 212 indicates information other than the control information relating to playback and moving of content. Examples of such information include: the URL of a server in which content is stored; the name and address of a content creator; and the name and address of a content copyright holder.

The UR registration unit 207 registers the UR stored in the UR storage unit 206 with the key distribution device 400.

<3-2. Operations of Content Creation Processing>

Figure 8:
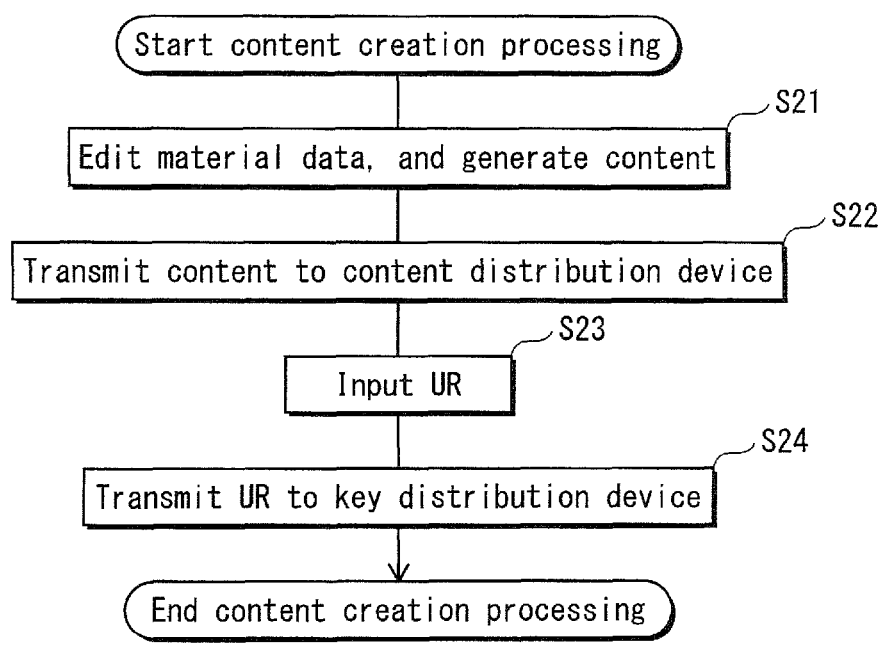
FIG. 8 is a flowchart showing operations of content creation processing.

FIG. 8 is a flowchart showing operations of the content creation processing by the content creation device 200.

The editing unit 202 creates content such as a movie by combining the plurality of material data pieces stored in the material storage unit 201 (step S21). The generated content is stored in the content storage unit 203.

The content registration unit 204 transmits the content to the content distribution device 300 (step S22).

Subsequently, the UR input unit 205 receives an input of a UR from the content creator (step S23). The input UR is stored in the UR storage unit 206.

The UR registration unit 207 transmits the UR to the key distribution device 400 (step S24).

<4. Content Distribution Device 300>

The following describes the content distribution device 300 in detail. The content distribution device 300 receives content from the content creation device 200, and encrypts the content with use of a title key. Also, the content distribution device 300 performs content distribution processing for distributing the content to the terminal device 600 connected via a network.

<4-1. Structure of Content Distribution Device 300>

Figure 9:
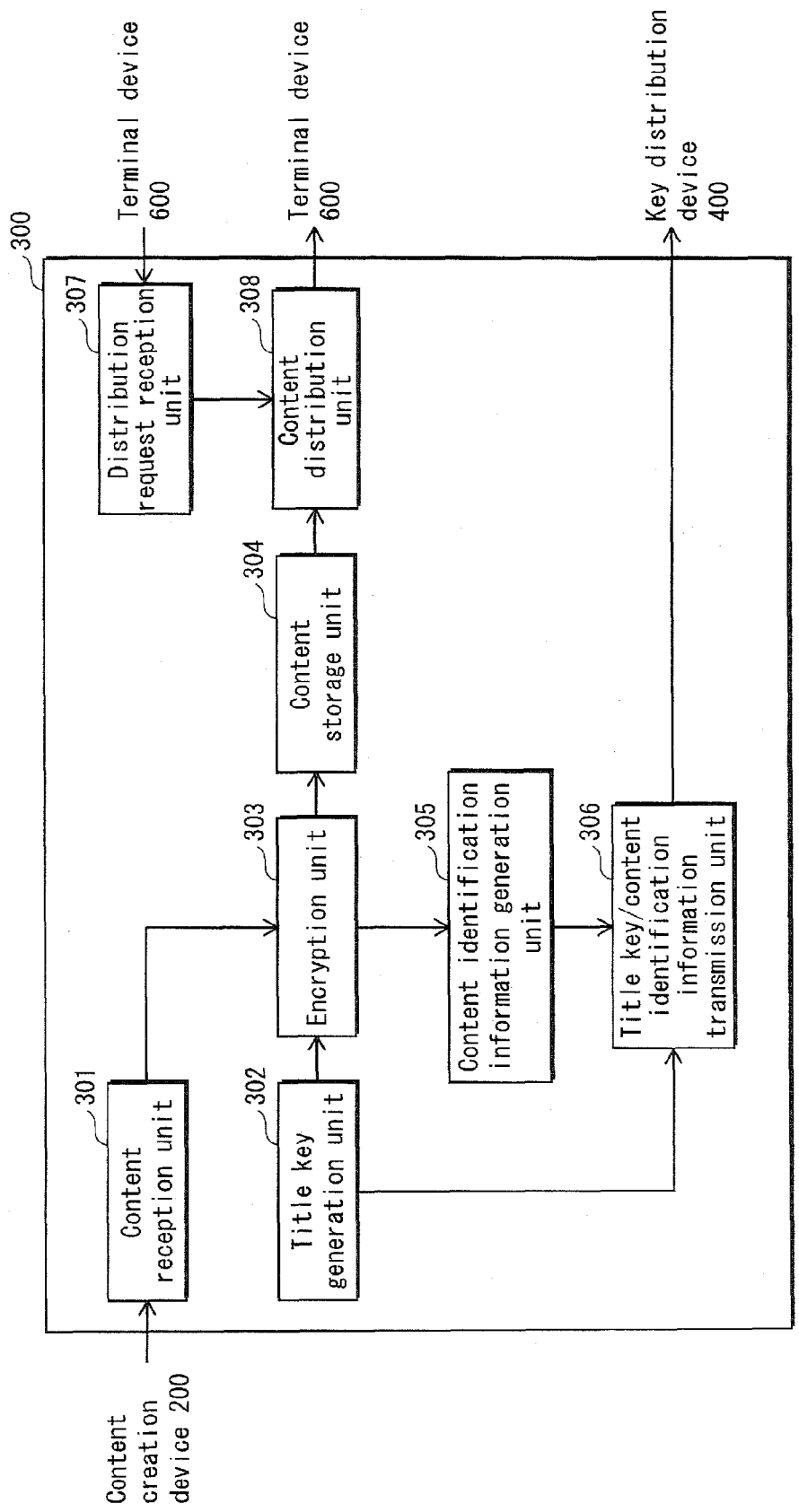
FIG. 9 is a block diagram showing a content distribution device 300.

FIG. 9 is a block diagram showing the functional structure of the content distribution device 300. As shown in FIG. 9, the content distribution device 300 includes a content reception unit 301, a title key generation unit 302, an encryption unit 303, a content storage unit 304, a content identification information generation unit 305, a title key/content identification information transmission unit 306, a distribution request reception unit 307, and a content distribution unit 308.

The content distribution device 300 includes a processor, a RAM, a ROM, and a hard disk that are not shown. Also, each function block of the content distribution device 300 is realized by hardware or by the processor executing a computer program stored in the ROM or the hard disk.

The content reception unit 301 receives content from the content creation device 200.

The title key generation unit 302 generates a title key that is an encryption key for encrypting the content. For example, the title key is a 128-bit random number.

The encryption unit 303 generates encrypted content. Specifically, the encryption unit 303 encrypts the content by applying an encryption algorithm E to the content with use of the title key as an encryption key. Hereinafter, the content having been encrypted with the title key is simply referred to as "content" unless otherwise specified. One example of the encryption algorithm E is an AES (Advanced Encryption Standard).

The content storage unit 304 stores therein the content encrypted by the encryption unit 303.

The content identification information generation unit 305 generates content identification information that uniquely identifies the content, from the content stored in the content storage unit 304.

Figure 10:
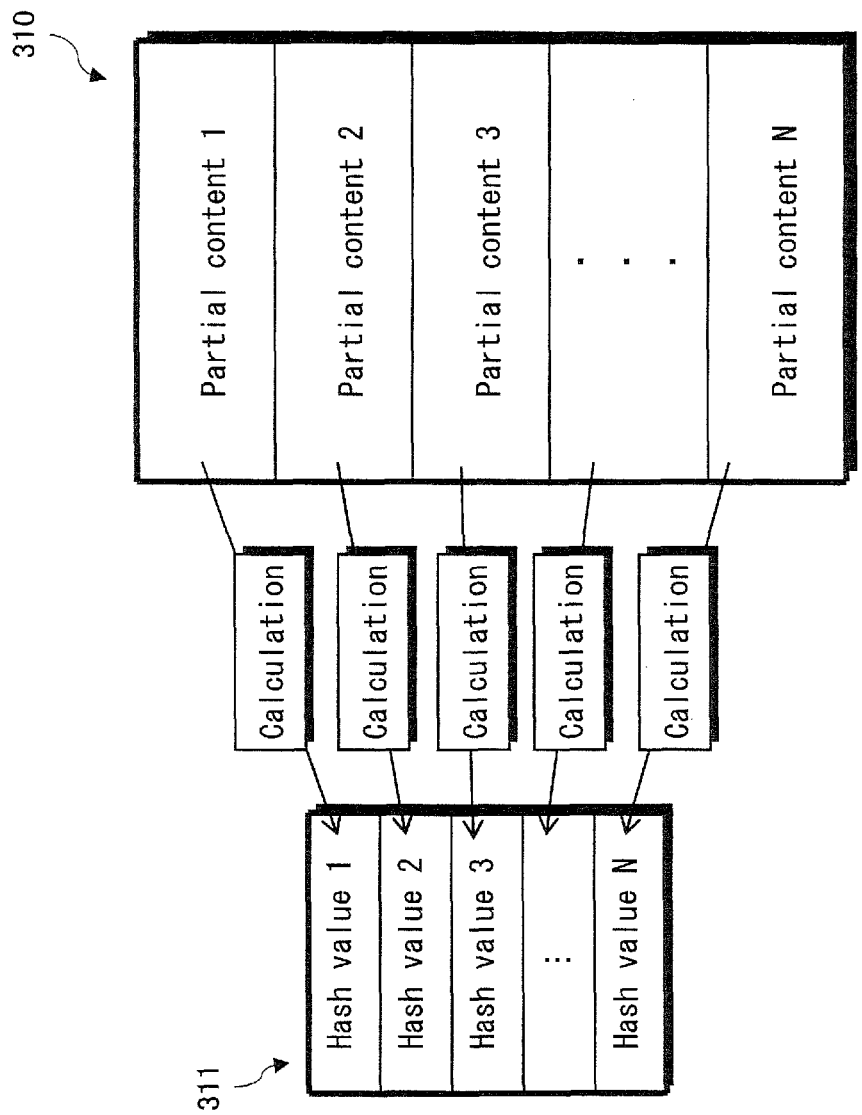
FIG. 10 is for explaining a generation method of content identification information 311.

FIG. 10 is for explaining a generation method of the content identification information. As shown in FIG. 10, the content identification information generation unit 305 divides content 310 into N partial contents. Then, the content identification information generation unit 305 calculates a hash value of each partial content. The content identification information generation unit 305 lists these N hash values in a hash table, and treats the hash table as content identification information 311.

The title key/content identification information transmission unit 306 transmits, to the key distribution device 400, the title key generated by the title key generation unit 302, and the content identification information generated by the content identification information generation unit 305.

The distribution request reception unit 307 receives distribution request data from the terminal device 600, and instructs the content distribution unit 308 to distribute content.

Upon being instructed by the distribution request reception unit 307 to distribute the content, the content distribution unit 308 searches the content storage unit 304 for the content specified by the distribution request data. If finding the content, the content distribution unit 308 reads the content from the content storage unit 304 and distributes the content to the terminal device 600. Note that the distribution request data includes information for specifying content to be distributed, and the content distribution unit 308 can search the content based on the distribution request data.

<4-2 Operations of Content Distribution Processing>

Figure 11:
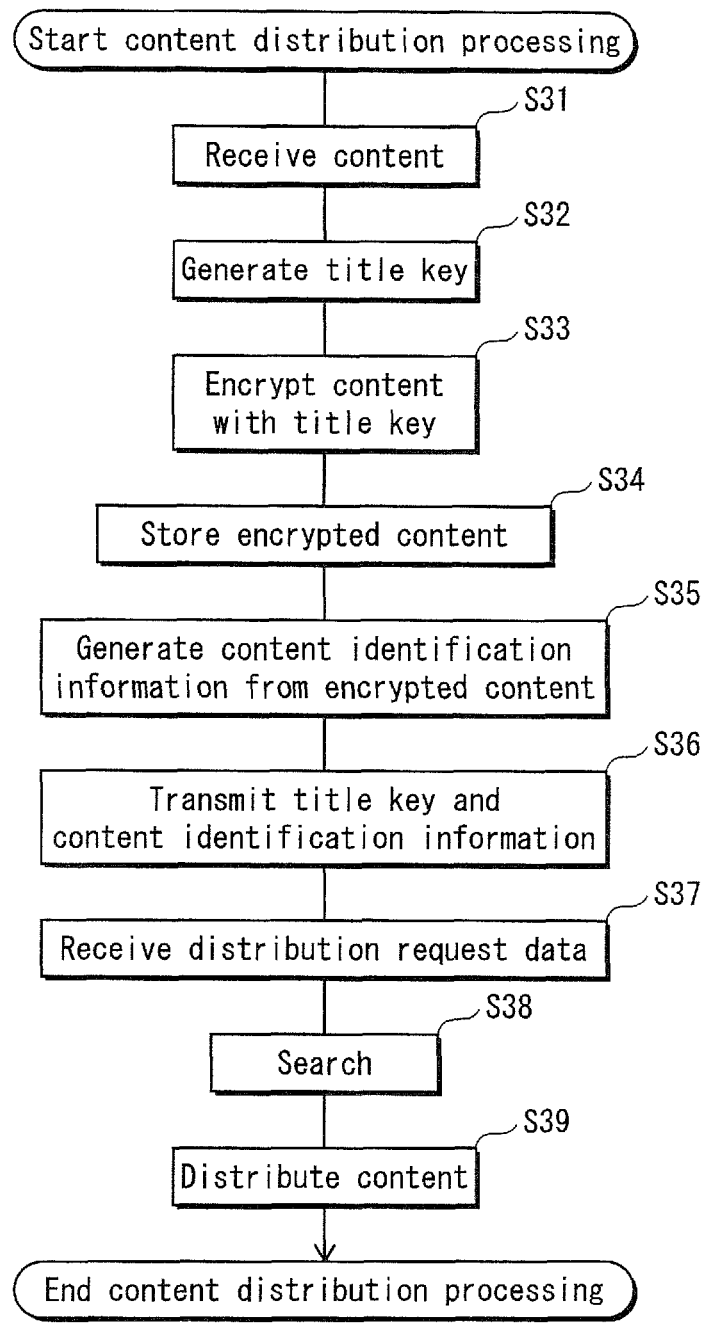
FIG. 11 is a flowchart showing operations of content distribution processing.

FIG. 11 is a flowchart showing operations of the content distribution processing by the content distribution device 300.

The content reception unit 301 receives content from the content creation device 200 (step S31), and outputs the content to the encryption unit 303.

The title key generation unit 302 generates a title key (step S32), and outputs the title key to the encryption unit 303 and the title key/content identification information transmission unit 306.

The encryption unit 303 encrypts the content with use of the title key, and thereby generates encrypted content (step S33). The encryption unit 303 stores the encrypted content into the content storage unit 304 (step S34).

The content identification information generation unit 305 generates content identification information from the encrypted content generated by the encryption unit 303 (step S35), and outputs the content identification information to the title key/content identification information transmission unit 306.

The title key/content identification information transmission unit 306 transmits the title key and the content identification information to the key distribution device 400 (step S36).

The distribution request reception unit 307 receives distribution request data from the terminal device 600 (step S37). The distribution request reception unit 307 instructs the content distribution unit 308 to distribute the content.

The content distribution unit 308 searches the content storage unit 304 for the content specified by the distribution request data (step S38). If finding the content, the content distribution unit 308 distributes the content to the terminal device 600 that has transmitted the distribution request data (step S39). If not finding the content, the content distribution unit 308 may notify the terminal device 600 accordingly.

<5. Key Distribution Device 400>

The following describes the key distribution device 400 in detail. The key distribution device 400 performs key distribution processing for transmitting a title key, a UR, a content signature, etc. which are necessary for playback of content, to the recording medium device 700 via the terminal device 600.

<5-1. Structure of Key Distribution Device 400>

Figure 12:
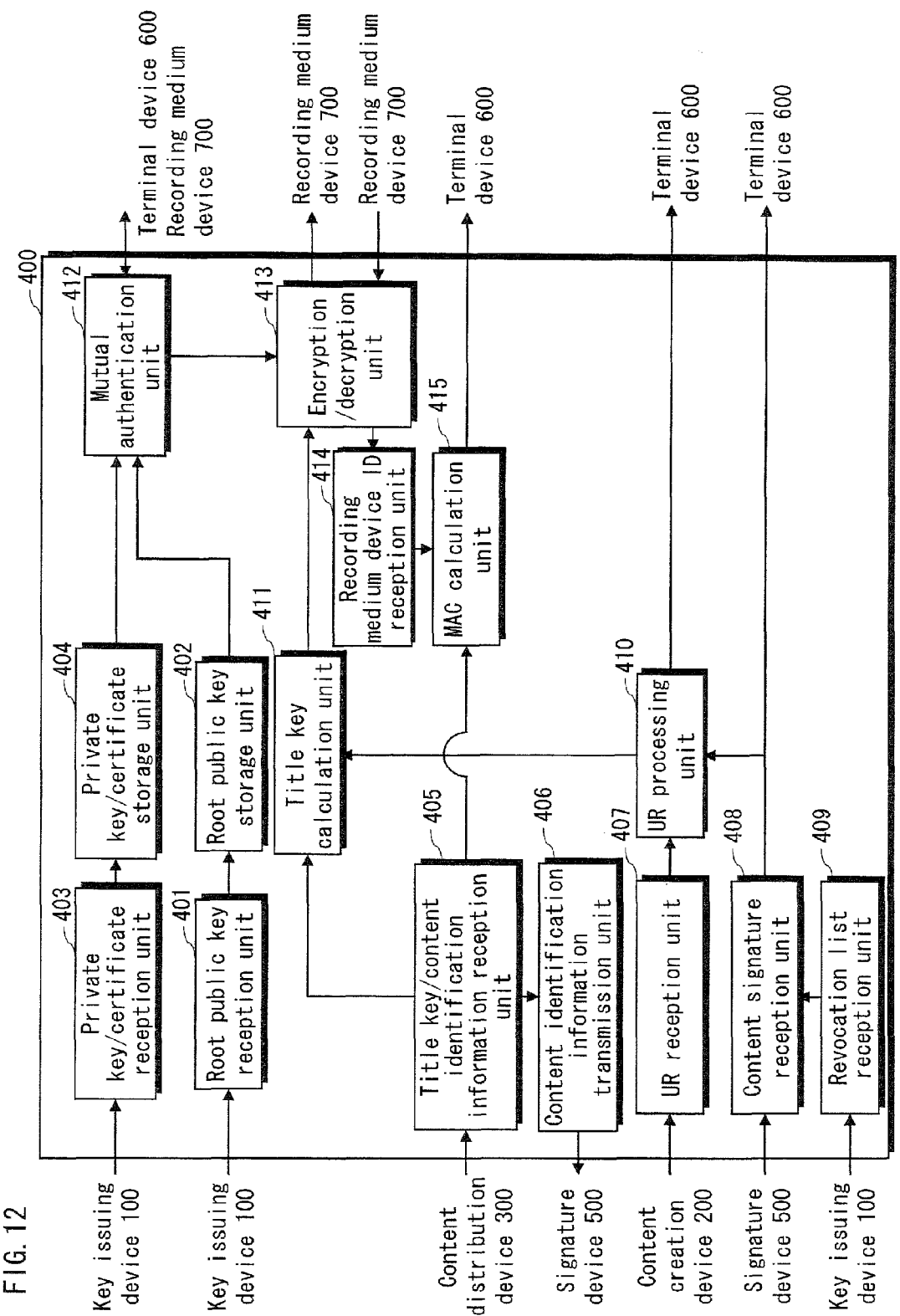
FIG. 12 is a block diagram showing a key distribution device 400.

FIG. 12 is a block diagram showing the functional structure of the content distribution device 400. As shown in FIG. 12, the key distribution device 400 includes a root public key reception unit 401, a root public key storage unit 402, a private key/certificate reception unit 403, a private key/certificate storage unit 404, a title key/content identification information reception unit 405, a content identification information transmission unit 406, a UR reception unit 407, a content signature reception unit 408, a revocation list reception unit 409, a UR processing unit 410, a title key calculation unit 411, a mutual authentication unit 412, an encryption/decryption unit 413, a recording medium device ID reception unit 414, and a MAC calculation unit 415.

The key distribution device 400 includes a processor, a RAM, a ROM, and a hard disk that are not shown. Also, each function block of the key distribution device 400 is realized by hardware or by the processor executing a computer program stored in the ROM or the hard disk.

The root public key reception unit 401 receives the root public key from the key issuing device 100.

The root public key storage unit 402 stores therein the root public key received by the root public key reception unit 401.

The private key/certificate reception unit 403 receives the key distribution device private key and the key distribution device certificate from the key issuing device 100.

The private key/certificate storage unit 404 stores therein the key distribution device private key and the key distribution device certificate received by the private key/certificate reception unit 403.

The title key/content identification information reception unit 405 receives a title key and content identification information from the content distribution device 300.

The content identification information transmission unit 406 transmits the content identification information received from the content distribution device 300 to the signature device 500. This is to receive a signature for the content identification information.

The UR reception unit 407 receives a UR from the content creation device 200.

The content signature reception unit 408 receives a content signature from the signature device 500. The content signature is data obtained by providing the content identification information with the signature of the signature device 500.

Upon receiving the content signature from the signature device 500, the content signature reception unit 408 judges whether the content signature is valid or invalid, with use of the revocation list held by the revocation list reception unit 409. If the content signature is judged to be invalid, the key distribution device 400 ends processing. If the content signature is judged to be valid, the content signature reception unit 408 outputs the content signature to the UR processing unit 410. Furthermore, the content signature reception unit 408 transmits the content signature to the terminal device 600.

Figure 13:
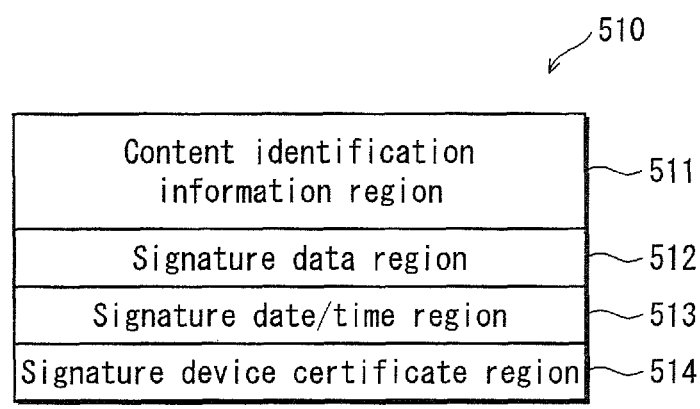
FIG. 13 shows the data structure of a content signature 510.

FIG. 13 shows an example of the content signature. As shown in FIG. 13, a content signature 510 is composed of a content identification information region 511, a signature data region 512, a signature date/time region 513, and a signature device certificate region 514.

The content identification information region 511 indicates the content identification information 311 which has been transmitted from the content identification information transmission unit 406 to the signature device 500. The signature data region 512 indicates signature data which has been generated by the signature device 500 using the signature device private key with respect to the content identification information 311 in the content identification information region 511. The signature date/time region 513 indicates the date and time on which the signature device 500 provided a signature (hereinafter "signature date and time"). The signature device certificate region 514 indicates the signature device certificate 130 (see FIG. 3B).

The revocation list reception unit 409 receives the revocation list from the key issuing device 100, and holds the revocation list therein.

The UR processing unit 410 generates a processed UR by adding data to the UR received by the UR reception unit 407, with use of the content signature received by the content signature reception unit 408. The UR processing unit 410 outputs the processed UR to the title key calculation unit 411. Furthermore, the UR processing unit 410 transmits the processed UR to the terminal device 600.

Figure 14B:
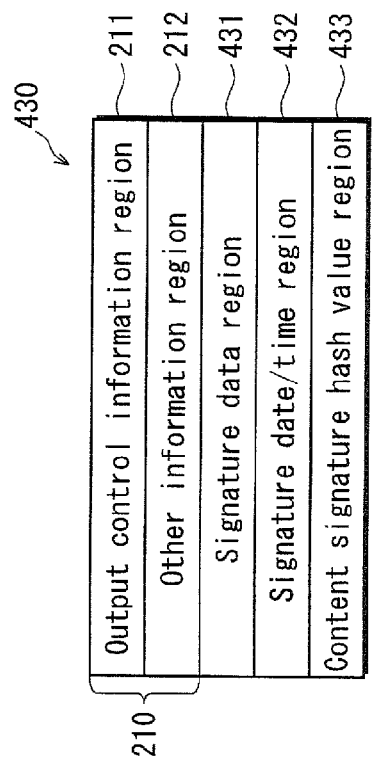
FIGS. 14A and 14B show a processed UR 420 and a processed UR 430, respectively.
Figure 14A:
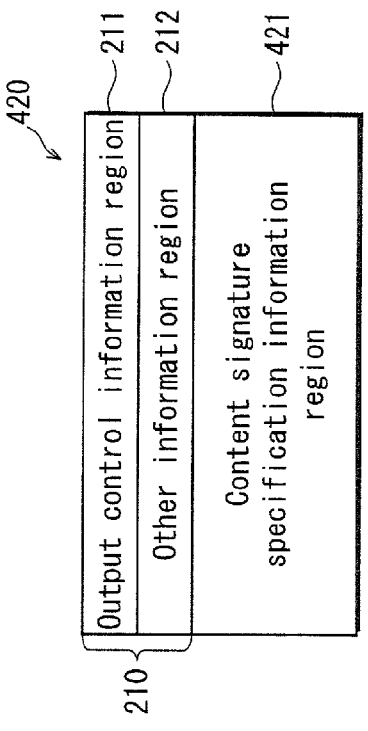

The following describes a specific example of the processed UR, with reference to FIGS. 14A and 14B.

A processed UR 420 shown in FIG. 14A is composed of the UR 210 and a content signature specification information region 421. As described above with reference to FIG. 7, the UR 210 is composed of the output control information region 211 and the other information region 212. The content signature specification information region 421 indicates information that uniquely identifies content. Examples of such information include a content signature, a hash value of the content signature on the whole, a hash value of content identification information, and part of the content identification information.

A processed UR 430 shown in FIG. 14B is composed of the UR 210, a signature data region 431, a signature date/time region 432, and a content signature hash value region 433. As described above with reference to FIG. 7, the UR 210 is composed of the output control information region 211 and the other information region 212. The signature data region 431, the signature date/time region 432, and the content signature hash value region 433 embody the content signature specification information region 421 of the processed UR 420. The signature data region 431 indicates the signature data recorded in the signature data region 512 of the content signature 510. The signature date/time region 432 indicates the date and time recorded in the signature date/time region 513 of the content signature 510. The content signature hash value region 433 indicates a hash value of the content signature 510 on the whole. The hash value of the content signature 510 on the whole is calculated by the UR processing unit 410. The following description is provided under the assumption that the processed UR 430 shown in FIG. 14B has already been generated.

The title key calculation unit 411 acquires the title key from the title key/content identification information reception unit 405, and the processed UR from the UR processing unit 410. Then, the title key calculation unit 411 calculates a hash value of the processed UR. The title key calculation unit 411 generates a calculated title key by performing an invertible calculation using the hash value of the processed UR and the title key. The calculated title key is a converted title key according to the present disclosure. For example, the title key calculation unit 411 performs an exclusive OR (XOR) operation on the hash value of the processed UR and the title key, and thereby generates the calculated title key (XORed title key). The calculated title key generated by the title key calculation unit 411 is passed to the encryption/decryption unit 413, encrypted by the encryption/decryption unit 413 with use of a shared key shared with the recording medium device 700, and thereafter transmitted.

The mutual authentication unit 412 performs mutual authentication with the terminal device 600 to share the shared key. The mutual authentication is performed with use of a method such as the Difiee-Hellman method for exchanging keys, which is based on the complexity of prime factorization, or the Elliptic Curve Difiee-Hellman (EC-DH) method for exchanging keys, which is based on the discrete logarithm problem on elliptic curves. Similarly, the mutual authentication unit 412 performs mutual authentication with the recording medium device 700, and shares a shared key with the recording medium device 700.

The encryption/decryption unit 413 uses the shared key shared with the terminal device 600 to encrypt and decrypt data exchanged with the terminal device 600. Also, the encryption/decryption unit 413 uses the shared key shared with the recording medium device 700 to encrypt the calculated title key generated by the title key calculation unit 411, and transmits the calculated title key thus encrypted to the recording medium device 700.

The recording medium device ID reception unit 414 receives, from the terminal device 600 via the encryption/decryption unit 413, a recording medium device ID for identifying a recording medium device to which content is to be written. Note that "via the encryption/decryption unit 413" means that the encryption/decryption unit 413 receives a recording medium device ID encrypted with use of the shared key, and decrypts the encrypted recording medium device ID with use of the shared key before outputting the recording medium device ID to the recording medium device ID reception unit 414.

The MAC calculation unit 415 calculates a Message Authentication Code (MAC) from the title key received by the title key/content identification information reception unit 405 and the recording medium device ID received by the recording medium device ID reception unit 414. For example, the MAC calculation unit 415 generates the MAC for verifying the integrity of the title key, by applying a MAC generation algorithm to the title key as an authentication message with use of the recording medium device ID as a key. The MAC calculation unit 415 transmits the generated MAC to the terminal device 600.

In the present embodiment, the MAC is used as medium binding information for associating the recording medium device 700 with the content and the title key that are to be recorded into the recording medium device 700. In other words, the MAC generated from the title key and the recording medium device ID is written into the recording medium device 700, and the MAC is verified upon playback of the content, so as to enable judgment on whether the content has been recorded in the recording medium device 700 in an authorized manner. If the content is copied into a recording medium device having a different recording medium device ID in an unauthorized manner, the terminal device 600 fails in verification of the MAC upon playback of the content. As a result, the terminal device 600 cannot playback the content that has been copied in an unauthorized manner.

<5-2. Operations of Mutual Authentication Processing>

Figure 15:
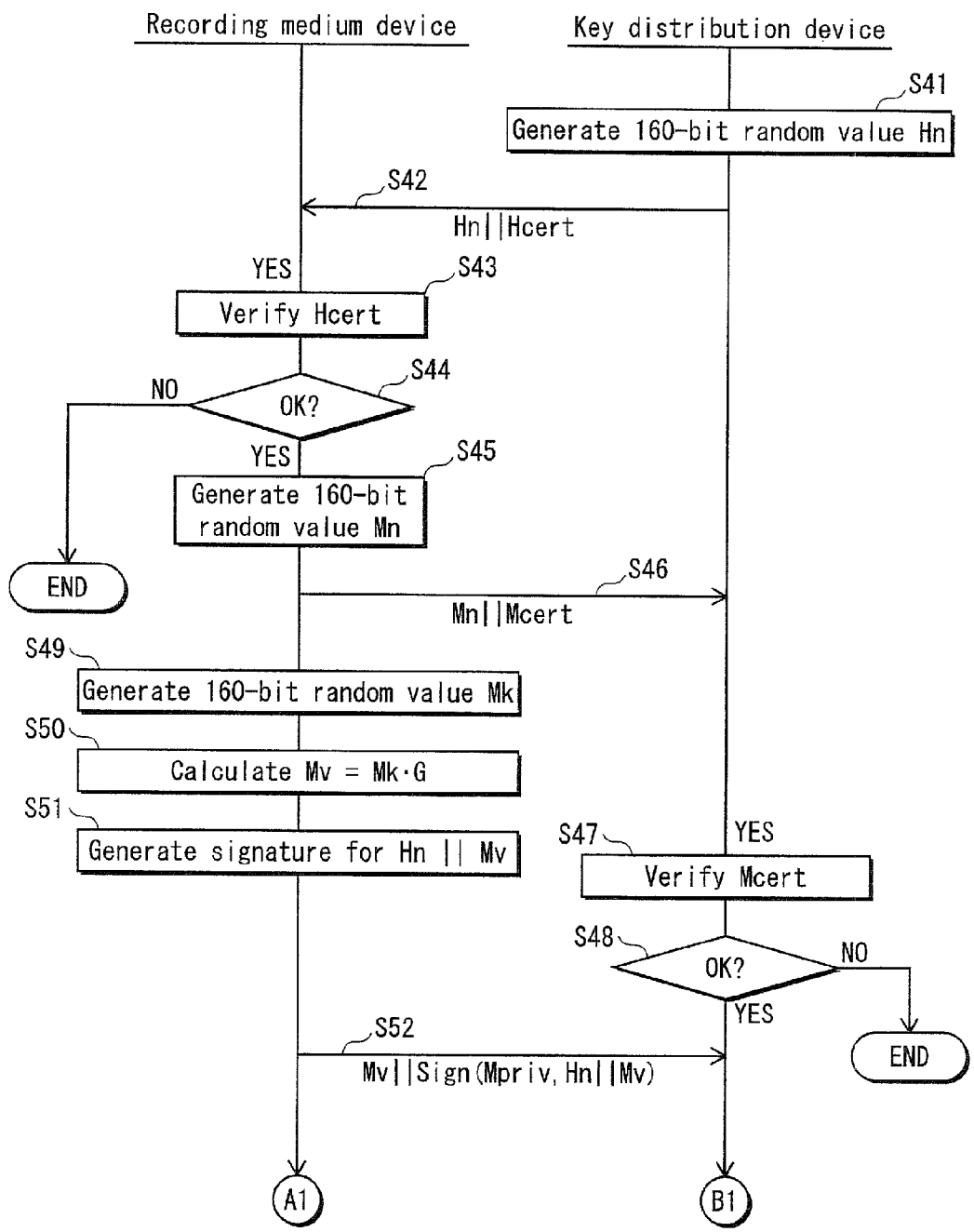
FIG. 15 is a flowchart showing operations of mutual authentication processing.
Figure 16:
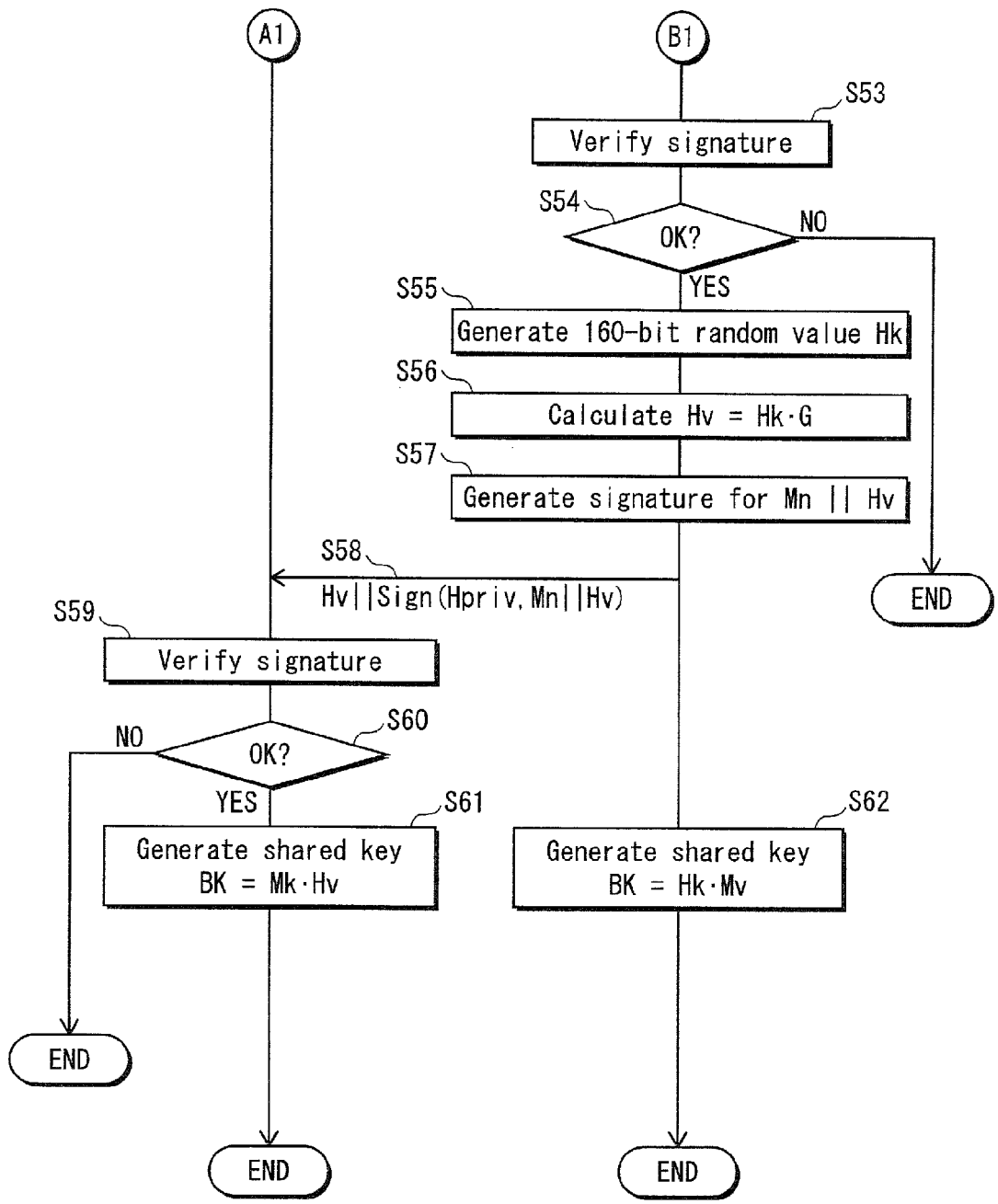
FIG. 16 is a flowchart showing operations of the mutual authentication processing.

The following describes an example of the mutual authentication processing by the mutual authentication unit 412, with reference to FIGS. 15 and 16. As one example, the mutual authentication processing described here is performed between the key distribution device 400 and the recording medium device 700.

The mutual authentication unit 412 of the key distribution device 400 generates a 160-bit random value Hn (Host nonce) (step S41). In the present example, a 160-bit random value is generated because of the use of the Elliptic Curve-Digital Signature Algorithm (EC-DSA) using a 160-bit key. However, the length of a random value generated here does not need to be 160 bits if another algorithm is used.

The mutual authentication unit 412 concatenates the 160-bit random value Hn generated in step S41 and the key distribution device certificate stored in the private key/certificate storage unit 404. The mutual authentication unit 412 transmits the concatenation as challenge data to the recording medium device 700 (step S42). In FIG. 13, "Hcert (Host Certificate)" denotes the key distribution device certificate. Also, "||" denotes concatenation of data.

Upon receiving the challenge data from the key distribution device 400, the recording medium device 700 verifies the key distribution device certificate Hcert included in the challenge data received in step S42 with use of the root public key (step S43). If the verification of the key distribution device certificate Hcert fails ("NO" in step S44), the recording medium device 700 ends the mutual authentication processing. If the verification of the key distribution device certificate Hcert is successful ("YES" in step S44), the recording medium device 700 generates a 160-bit random value Mn (Media nonce) (step S45).

The recording medium device 700 concatenates the 160-bit random value Mn generated in step S45 and the recording medium device certificate. The recording medium device 700 transmits the concatenation as challenge data to the key distribution device 400 (step S46). In FIG. 13, "Mcert (Media Certificate)" denotes the recording medium device certificate.

Upon receiving the challenge data from the recording medium device 700, the key distribution device 400 verifies the recording medium device certificate Mcert included in the challenge data received in step S46 with use of the root public key (step S47). If the verification of the recording medium device certificate Mcert fails ("NO" in step S48), the key distribution device 400 ends the mutual authentication processing. If the verification of the recording medium device certificate Mcert is successful ("YES" in step S48), the mutual authentication unit 412 of the key distribution device 400 proceeds to step S53.

After transmitting the challenge data in step S46, the recording medium device 700 generates a 160-bit random value Mk (Media Key) (step S49). Note that if an algorithm different from the EC-DH is used, the length of the random value generated in step S49 does not need to be 160 bits.

The recording medium device 700 calculates Mv=Mk·G (step S50), where Mk denotes the random value generated in step S49, and G denotes a base point G which is a predetermined parameter of elliptic curve cryptography in the content distribution system according to the present disclosure.

Furthermore, the recording medium device 700 generates a digital signature (Sign(Mpriv, Hn||Mv)) for Hn||Mv, with use of the recording medium device private key (Mpriv) (step S51). Hn||Mv is data obtained by concatenating the value Hn included in the challenge data received in step S42 and the value Mv calculated in step S50.

The recording medium device 700 concatenates the value Mv calculated in step S50 and the digital signature Sign (Mpriv, Hn||Mv) generated in step S51, and transmits the resultant concatenated data to the key distribution device 400 as response data (step S52).

The mutual authentication unit 412 of the key distribution device 400 receives the response data from the recording medium device 700. The mutual authentication unit 412 verifies the digital signature Sign(Mpriv, Hn||Mv) included in the received response data (step S53). Specifically, the mutual authentication unit 412 verifies the digital signature by extracting the value Mv from the response data, concatenating the value Hn generated in step S41 and the value Mv, and using the recording medium device public key included in the recording medium device certificate Mcert with respect to the resultant concatenated data.

If the verification of the digital signature fails ("NO" in step 54), the key distribution device 400 ends the mutual authentication processing. If the verification of the digital signature is successful ("YES" in step S54), the mutual authentication unit 412 generates a 160-bit random value Hk (Host Key) (step S55).

The mutual authentication unit 412 calculates Hv=Hk·G (step S56), where Hk denotes the random value generated in step S55, and G denotes the base point G which is the predetermined parameter of elliptic curve cryptography in the content distribution system according to the present disclosure.

Furthermore, the mutual authentication unit 412 generates a digital signature (Sign(Hpriv, Mn||Hv)) for Mn||Hv, with use of the key distribution device private key (Hpriv) (step S57). Mn||Hv is data obtained by concatenating the value Mn included in the challenge data received in step S46 and the value Hv calculated in step S56.

The mutual authentication unit 412 concatenates the value Hv calculated in step S56 and the digital signature Sign (Hpriv, Mn||Hv) generated in step S57, and transmits the resultant concatenated data to the recording medium device 700 as response data (step S58).

The recording medium device 700 receives the response data from the key distribution device 400. The recording medium device 700 verifies the digital signature Sign(Hpriv, Mn||Hv) included in the received response data (step S59). Specifically, the recording medium device 700 verifies the digital signature by extracting the value Hv from the response data, concatenating the value Mn generated in step S45 and the value Hv, and using the key distribution device public key included in the public key certificate Hcert of the key distribution device 400 with respect to the resultant concatenated data.

If the verification of the digital signature fails ("NO" in step 60), the recording medium device 700 ends the mutual authentication processing. If the verification of the digital signature is successful ("YES" in step S60), the recording medium device 700 calculates BK=Mk·Hv, where Mk denotes the random value generated in step S49, and Hv denotes the value included in the response data received in step S58, and thereby generates a shared key BK (Bus Key) (step S61).

Meanwhile, the mutual authentication unit 412 of the key distribution device 400 calculates BK=Hk·Mv, where Hk denotes the random value generated in step S55, and Mv denotes the value included in the response data received in step S52, and thereby generates the shared key BK (step S62).

The above processing enables the key distribution device 400 and the recording medium device 700 to check each other's authenticity and to share the shared key BK unknown to the terminal device 600. The key distribution device 400 and the recording medium device 700 establishes a secure communication channel (session) using the shared key BK, and securely exchanging communication data without letting the communication data be known to the terminal device 600.

In the present example, a description has been provided of the mutual authentication processing between the key distribution device 400 and the recording medium device 700. However, mutual authentication processing is performed similarly between the key distribution device 400 and the terminal device 600, and between the terminal device 600 and the recording medium device 700. Note that the steps of the mutual authentication processing described above are only an example, and a different method may be used for the mutual authentication processing.

<5-3. Operations of Key Distribution Processing>

Figure 17:
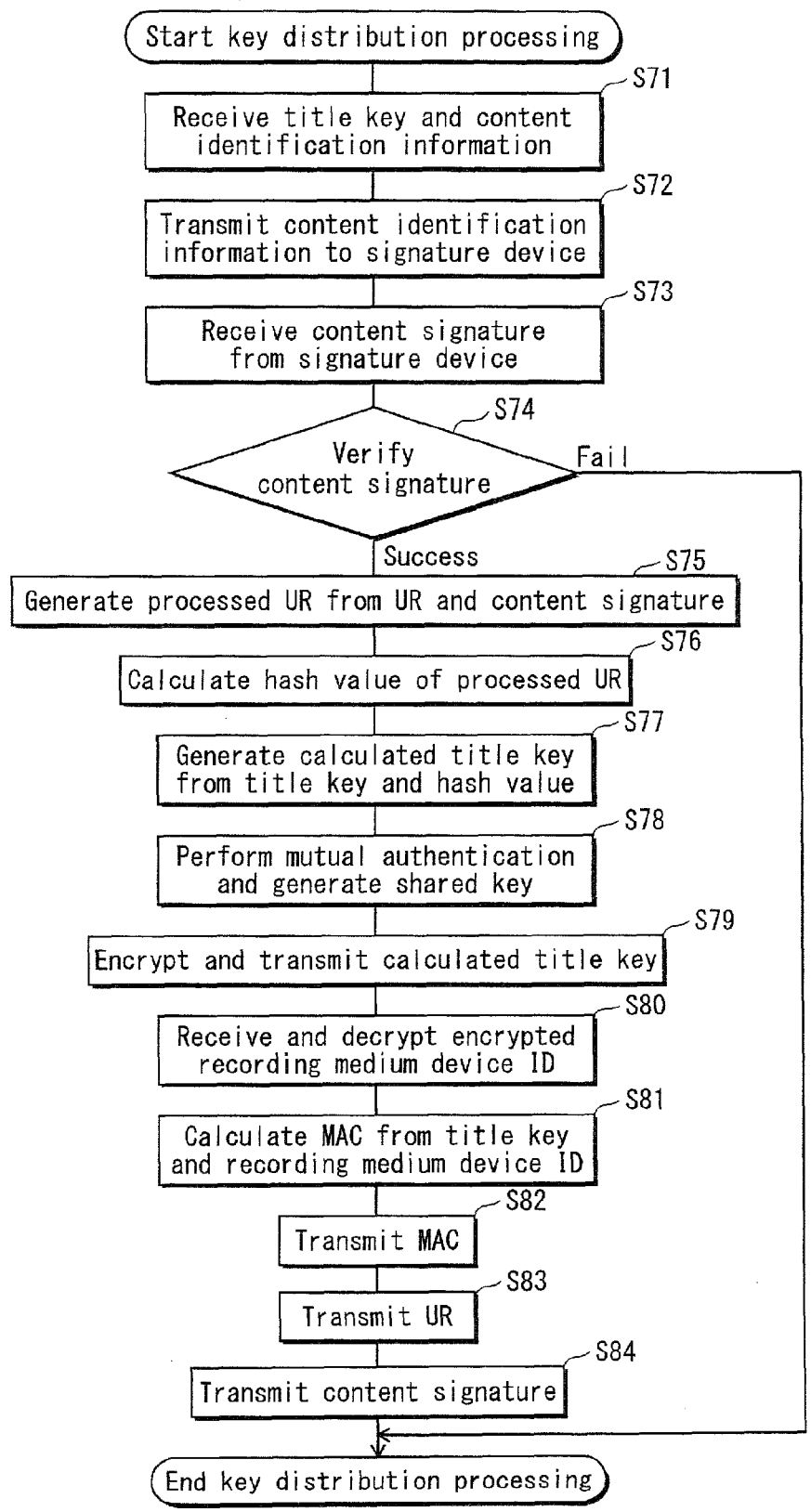
FIG. 17 is a flowchart showing operations of key distribution processing.

FIG. 17 is a flowchart showing operations of the key distribution processing by the key distribution device 400.

Before the key distribution processing, the key distribution device 400 receives, from the key issuing device 100, the root public key, the key distribution device private key, the key distribution device certificate 120, and the revocation list 160, and stores these pieces of information therein. Also, the key distribution device 400 receives the UR 210 from the content creation device 200, and stores the UR 210 therein.

The following processing is performed when the key distribution device 400 receives, from the terminal device 600 or the recording medium device 700, a request for transmitting a title key thereto.

The title key/content identification information reception unit 405 receives the title key and the content identification information 311 from the content distribution device 300 (step S71).

The content identification information transmission unit 406 transmits the content identification information 311 received in step S71 to the signature device 500 (step S72).

The content signature reception unit 408 receives the content signature 510 from the signature device 500 (step S73). The content signature 510 received in step S73 is obtained by the signature device 500 providing the signature data for the content identification information 311 transmitted to the signature device 500 in step S72.

The content signature reception unit 408 verifies the content signature 510 received in step S73 (step S74). Specifically, the content signature reception unit 408 extracts the signature device ID from the signature device certificate 130 included in the received content signature 510. Then, the content signature reception unit 408 refers to the revocation list 160 already held in the revocation list reception unit 409, and judges whether or not the signature device ID is included in the revocation list.

If the signature device ID is included in the revocation list 160, i.e., the signature device 500 has been revoked, the content signature reception unit 408 judges the received content signature 510 to be invalid ("Fail" in step S64), and the key distribution device 400 ends the processing.

If the signature device ID is not included in the revocation list 160, i.e., the signature device 500 has not been revoked, the content signature reception unit 408 judges the received content signature 510 to be valid ("Success" in step S74). Then, the content signature reception unit 408 outputs the content signature 510 to the UR processing unit 410, and further transmits the content signature 510 to the terminal device 600.

The UR processing unit 410 generates the processed UR 430, with use of the UR 210 already received and held by the UR reception unit 407 and the content signature 510 received from the content signature reception unit 408 (step S75).

Specifically, the UR processing unit 410 calculates the hash value of the content signature 510 on the whole. Subsequently, the UR processing unit 410 adds, to the UR 210, data recorded in the signature data region 512 of the content signature 510, data recorded in the signature date/time region 513, and the calculated hash value, and thereby generates the processed UR 430.

The UR processing unit 410 outputs the generated processed UR 430 to the title key calculation unit 411.

Upon receiving the processed UR 430, the title key calculation unit 411 calculates a hash value of the processed UR 430 (step S76). Furthermore, the title key calculation unit 411 receives the title key from the title key/content identification information reception unit 405. The title key calculation unit 411 performs an exclusive OR (XOR) operation on the hash value of the processed UR 430 and the title key, and thereby generates a calculated title key (step S77).

The mutual authentication unit 412 performs mutual authentication with each of the terminal device 600 and the recording medium device 700 (step S78). During the mutual authentication processing in step S78, the mutual authentication unit 412 verifies the authenticity of the terminal device 600, and shares a shared key BK1 with the terminal device 600. Similarly, the mutual authentication unit 412 verifies the authenticity of the recording medium device 700, and shares a shared key BK2 with the recording medium device 700.

The encryption/decryption unit 413 encrypts the calculated title key generated in step S77 with use of the shared key BK2, and transmits the calculated title key thus encrypted to the recording medium device 700 (step S79).

Next, the encryption/decryption unit 413 receives, from the terminal device 600, the recording medium device ID encrypted with use of the shared key BK1 (step S73), and decrypts the encrypted recording medium device ID with use of the shared key BK1 (step S80). The encryption/decryption unit 413 outputs the decrypted recording medium device ID to the recording medium device ID reception unit 414. Upon receiving the recording medium device ID, the recording medium device ID reception unit 414 outputs the recording medium device ID to the MAC calculation unit 415.

The MAC calculation unit 415 receives the title key from the title key/content identification information reception unit 405. Also, the MAC calculation unit 415 receives the recording medium device ID from the recording medium device ID reception unit 414. The MAC calculation unit 415 calculates a MAC from the title key and the recording medium device ID (step S81). The MAC calculation unit 415 transmits the MAC to the terminal device 600 (step S82).

Next, the UR processing unit 410 transmits the processed UR 430 to the terminal device 600 (step S83). Finally, the content signature reception unit 408 transmits the content signature to the terminal device 600 (step S84).

<6. Signature Device 500>

The following describes the signature device 500 in detail. The signature device 500 performs content signature generation processing, in which the signature device 500 receives the content identification information from the key distribution device 400, generates the content signature by providing the content identification information with a signature using an authorized signature key, and transmits the content signature to the key distribution device 400.

<6-1. Structure of Signature Device 500>

Figure 18:
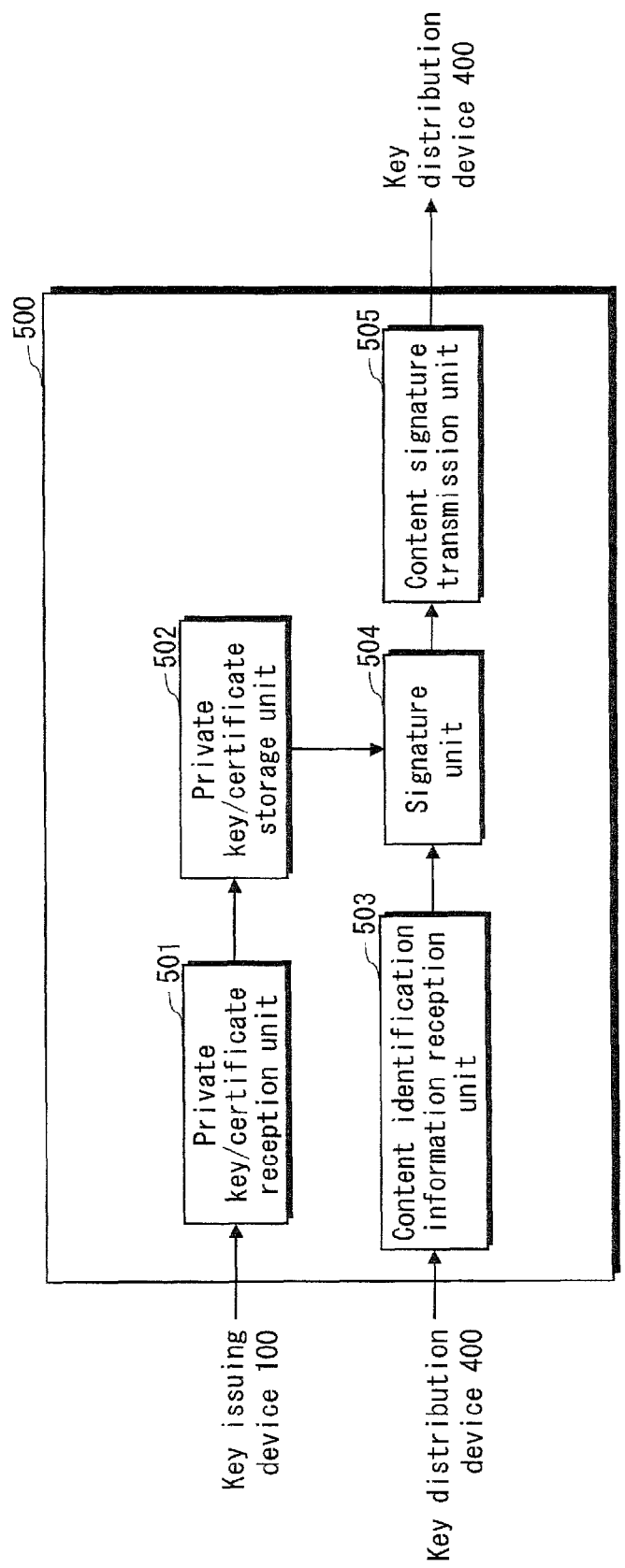
FIG. 18 is a block diagram showing a signature device 500.

FIG. 18 is a block diagram showing a functional structure of the signature device 500. As shown in FIG. 18, the signature device 500 includes a private key/certificate reception unit 501, a private key/certificate storage unit 502, a content identification information reception unit 503, a signature unit 504, and a content signature transmission unit 505.

The signature device 500 includes a processor, a RAM, a ROM, and a hard disk that are not shown. Also, each function block of the signature device 500 is realized by hardware or by the processor executing a computer program stored in the ROM or the hard disk.

The private key/certificate reception unit 501 receives the signature device private key and the signature device certificate from the key issuing device 100.

The private key/certificate storage unit 502 stores therein the signature device private key and the signature device certificate.

The content identification information reception unit 503 receives content identification information from the key distribution device 400.

The signature unit 504 holds therein a clock that measures time. The signature unit 504 receives the content identification information from the content identification information reception unit 503, and provides the content identification information with signature data, etc., to generate a content signature. The signature unit 504 outputs the generated content signature to the content signature transmission unit 505.

The content signature transmission unit 505 receives the content signature from the signature unit 504, and transmits the content signature to the key distribution device 400 from which the content identification information has been transmitted.

<6-2 Operations of Content Signature Generation Processing>

Figure 19:
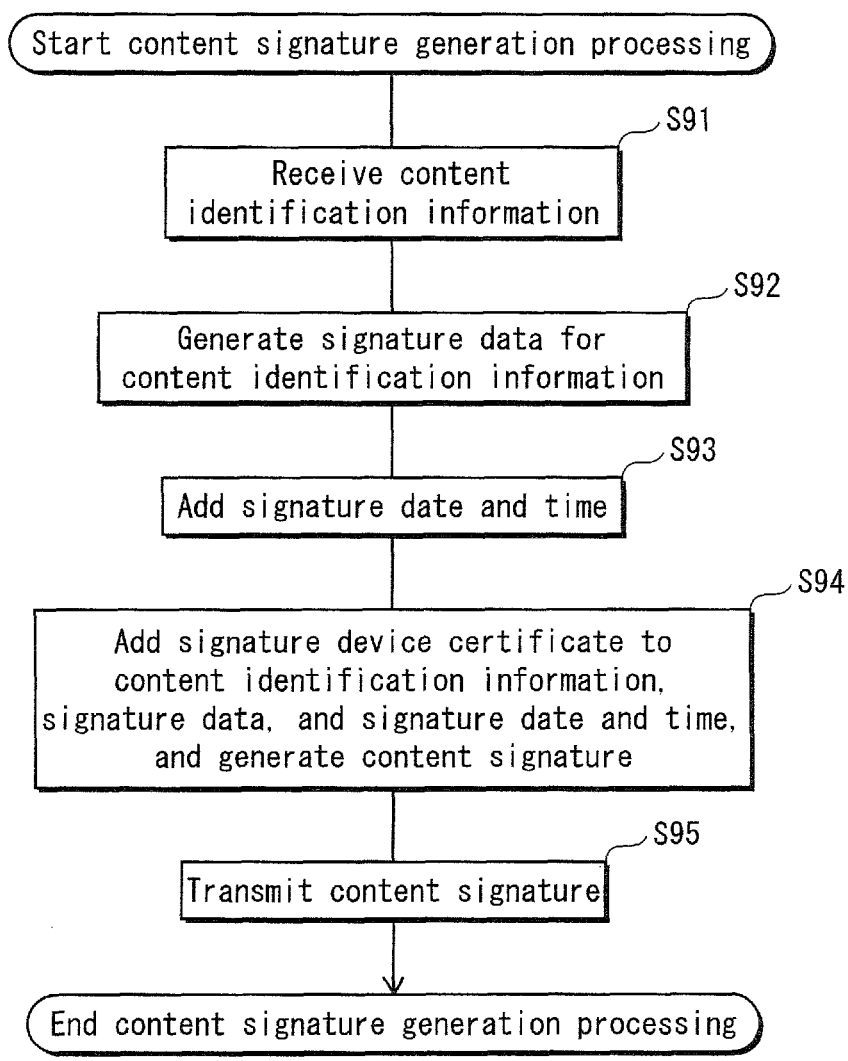
FIG. 19 is a flowchart showing operations of content signature generation processing.

FIG. 19 is a flowchart showing operations of the content signature generation processing by the signature device 500.

Before the content signature generation processing, the signature device 500 receives the signature device private key and the signature device certificate 130 from the key issuing device 100, and stores therein the signature device private key and the signature device certificate 130.

The content identification information reception unit 503 receives the content identification information 311 from the key distribution device 400 (step S91).

The signature unit 504 generates signature data by applying a signature generation algorithm S to the content identification information 311, with use of the signature device private key as a signature key (step S92). For example, the signature generation algorithm S is the Digital Signature Algorithm (DSA).

The signature unit 504 writes the content identification information 311 received in step S91 into the content identification information region 511, and writes the signature data generated in step S92 into the signature data region 512.

Next, the signature device 500 acquires the current date and time from the clock held therein, and writes the current date and time into the signature date/time region 513 (step S93).

Finally, the signature device 500 writes the signature device certificate 130 into the signature device certificate region 514, and thereby generates the content signature 510 (step S94).

The content signature transmission unit 505 transmits the content signature 510 generated in step S94 to the key distribution device 400 (step S95).

<7. Terminal Device 600>

The following describes the terminal device 600 in detail.

The terminal device 600 is a PC including: a processor; a ROM; a RAM; a hard disk; a keyboard and a mouse that are input devices; a monitor that is a display device; a card slot for inserting the recording medium device 700 therein; a network connection unit; and so on. A computer program is recorded on the ROM, the RAM, or the hard disk. Some functions of the terminal device 600 can be realized by the processor executing the computer program.

The terminal device 600 receives content from the content distribution device 300, via a network such as the Internet or digital broadcasting. Also, the terminal device 600 receives a content signature, a UR, a MAC, and a calculated title key from the key distribution device 400. The terminal device 600 performs content recording processing for recording the received content, etc., into the recording medium device 700.

Also, the terminal device 600 performs content playback processing for reading the content from the recording medium device 700 in which the content, the content signature, the UR, the MAC, and the calculated title key have been recorded, and playing back the content.

<7-1. Structure of Terminal Device 600>

Figure 20:
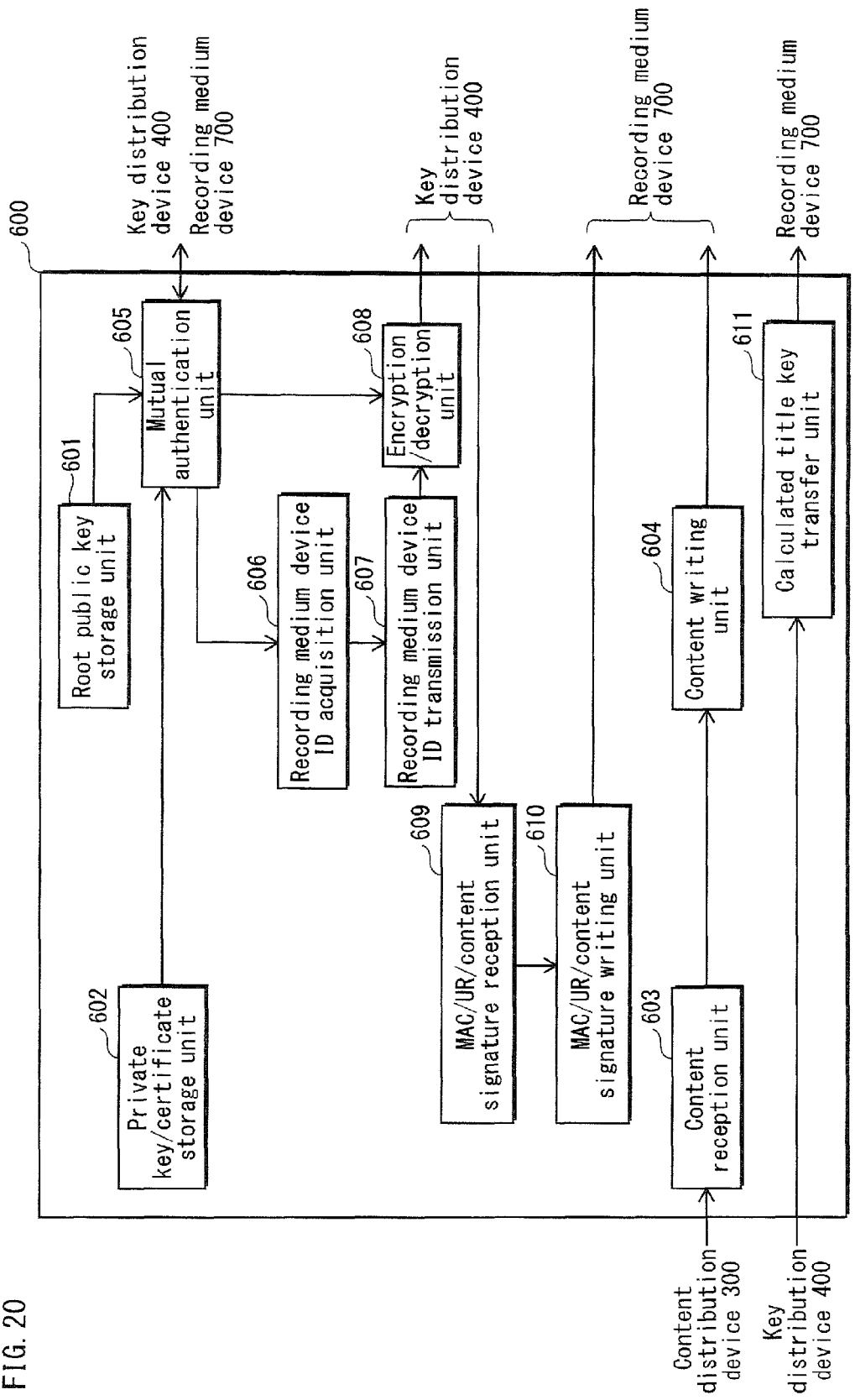
FIG. 20 is a block diagram showing a terminal device 600.
Figure 21:
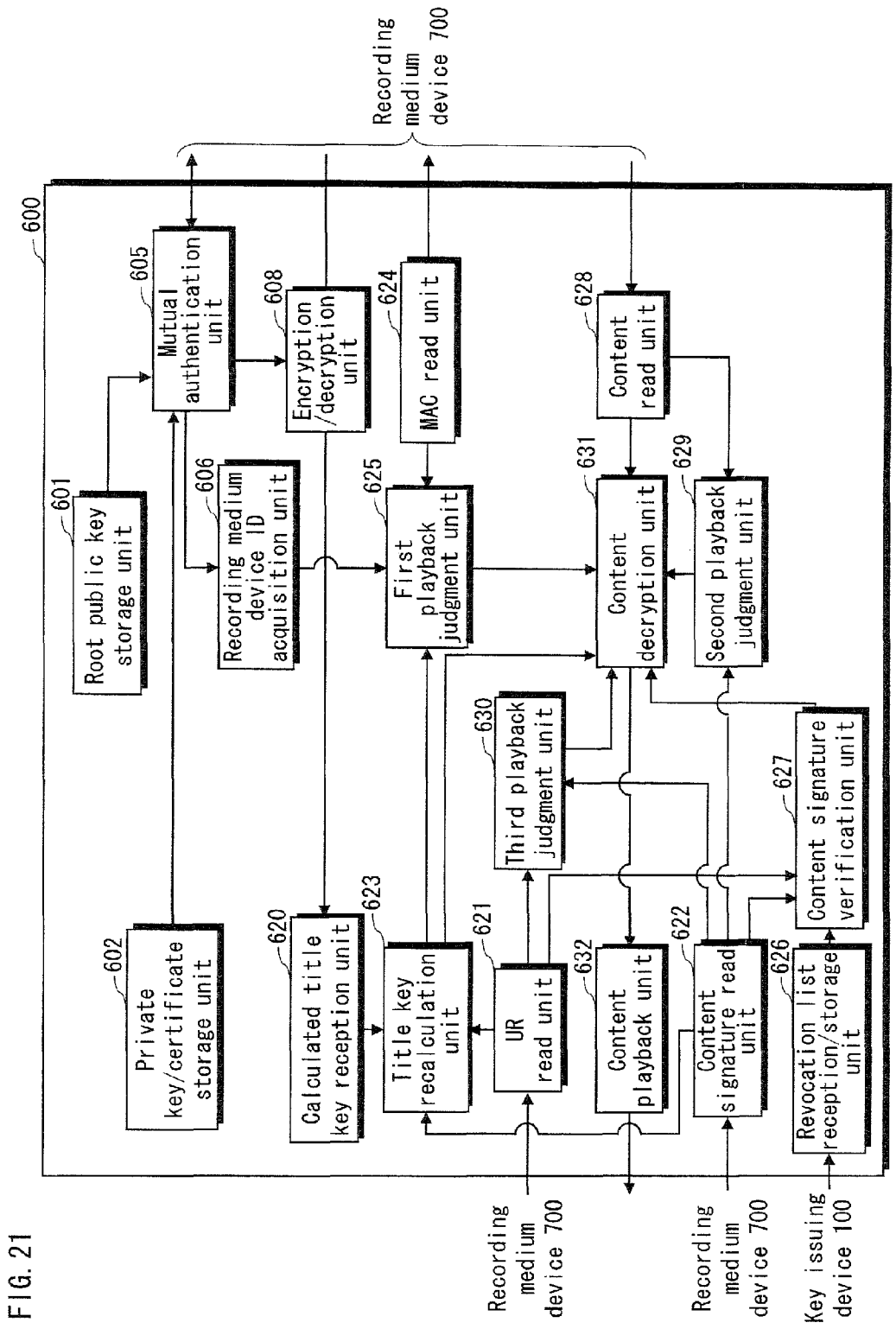
FIG. 21 is a block diagram showing the terminal device 600.

FIGS. 20 and 21 are block diagrams each showing a functional structure of the terminal device 600.

Specifically, FIG. 20 shows a functional structure of the terminal device 600 during the content recording processing. FIG. 21 shows a functional structure of the terminal device 600 during the content playback processing.

As shown in FIGS. 20 and 21, the terminal device 600 includes a root public key storage unit 601, a private key/certificate storage unit 602, a content reception unit 603, a content writing unit 604, a mutual authentication unit 605, a recording medium device ID acquisition unit 606, a recording medium device ID transmission unit 607, an encryption/decryption unit 608, a MAC/UR/content signature reception unit 609, a MAC/UR/content signature writing unit 610, a calculated title key transmission unit 611, a calculated title key reception unit 620, a UR read unit 621, a content signature read unit 622, a title key recalculation unit 623, a MAC read unit 624, a first playback judgment unit 625, a revocation list reception/storage unit 626, a content signature verification unit 627, a content read unit 628, a second playback judgment unit 629, a third playback judgment unit 630, a content decryption unit 631, and a content playback unit 632.

The root public key storage unit 601 stores therein the root public key generated by the key issuing device 100.

The private key/certificate storage unit 602 stores therein the terminal device private key and the terminal device certificate 140 generated by the key issuing device 100.

Note that the root public key, the terminal device private key, and the terminal device certificate 140 are embedded in the terminal device 600 by a device that manufactures the terminal device 600, during manufacturing of the terminal device 600.

The content reception unit 603 receives content from the content distribution device 300.

The content writing unit 604 writes the content received by the content reception unit 603 into a regular region of the recording medium device 700.

The mutual authentication unit 605 performs mutual authentication with the key distribution device 400, verifies the authenticity of the key distribution device 400, and shares the shared key BK1 with the key distribution device 400. Also, the mutual authentication unit 605 performs mutual authentication with the recording medium device 700, verifies the authenticity of the recording medium device 700, and shares a shared key BK3 with the recording medium device 700. The mutual authentication processing is described above with reference to FIGS. 15 and 16; therefore, a description thereof is omitted here.

During the content recording processing, the recording medium device ID acquisition unit 606 acquires the recording medium device ID from the recording medium device certificate 150 received during the mutual authentication processing by the mutual authentication unit 605, and outputs the recording medium device ID to the recording medium device ID transmission unit 607.

During the content playback processing, the recording medium device ID acquisition unit 606 acquires the recording medium device ID from the recording medium device certificate 150 received during the mutual authentication processing by the mutual authentication unit 605, and outputs the recording medium device ID to the first playback judgment unit 625.

The recording medium device ID transmission unit 607 receives the recording medium device ID from the recording medium device ID acquisition unit 606, and transmits the recording medium device ID to the key distribution device 400 via the encryption/decryption unit 608.

The encryption/decryption unit 608 encrypts and decrypts data exchanged with the key distribution device 400, with use of the shared key BK1 shared with the key distribution device 400. Similarly, the encryption/decryption unit 608 encrypts and decrypts data exchanged with the recording medium device 700, with use of the shared key BK3 shared with the recording medium device 700.

The MAC/UR/content signature reception unit 609 receives a MAC, the processed UR 430, and the content signature 510 from the key distribution device 400. The MAC received by the MAC/UR/content signature reception unit 609 is a MAC calculated from (i) the title key used to encrypt the content written by the content writing unit 604 into the recording medium device 700 and (ii) the recording medium device ID transmitted by the recording medium device ID transmission unit 607 to the key distribution device 400. The MAC/UR/content signature reception unit 609 outputs the MAC, the processed UR 430, and the content signature 510 thus received to the MAC/UR/content signature writing unit 610.

The MAC/UR/content signature writing unit 610 receives the MAC, the processed UR 430, and the content signature 510 from the MAC/UR/content signature reception unit 609, and writes these pieces of information into the regular region of the recording medium device 700.

The calculated title key transfer unit 611 transfers communication data exchanged between the key distribution device 400 and the recording medium device 700. Specifically, the communication data transferred by the calculated title key transfer unit 611 includes an encrypted calculated title key generated by encrypting a calculated title key with use of the shared key BK2, which is shared between the key distribution device 400 and the recording medium device 700 through the mutual authentication processing.

After a session is established between the key distribution device 400 and the recording medium device 700 through the mutual authentication processing and the communication data is transmitted via the session, the calculated title key transfer unit 611 simply transfers the communication data without verifying or modifying the data, except for control data indicating information such as the start and end of communication. Because of not knowing the value of the shared key BK2 shared between the key distribution device 400 and the recording medium device 700, the terminal device 600 cannot decrypt the encrypted calculated title key.

During the content playback processing, the calculated title key reception unit 620 receives, from the recording medium device 700 via the encryption/decryption unit 608, a calculated title key generated from a title key used to encrypt the content to be played back. The calculated title key reception unit 620 outputs the calculated title key thus received to the title key recalculation unit 623.

The UR read unit 621 reads, from the recording medium device 700, the processed UR 430 corresponding to the content to be played back. The UR read unit 621 outputs the processed UR 430 thus read to the title key recalculation unit 623, the content signature verification unit 627, and the third playback judgment unit 630.

The content signature read unit 622 reads, from the recording medium device 700, the content signature 510 corresponding to the content to be played back. The content signature read unit 622 outputs the content signature 510 thus read to the title key recalculation unit 623, the content signature verification unit 627, the second playback judgment unit 629, and the third playback judgment unit 630.

The title key recalculation unit 623 receives the processed UR 430 from the UR read unit 621, the calculated title key from the calculated title key reception unit 620, and the content signature 510 from the content signature read unit 622. The title key recalculation unit 623 performs calculation using these pieces of information, and thereby generates a title key. The title key recalculation unit 623 outputs the title key thus generated to the first playback judgment unit 625 and the content decryption unit 631.

Note that the calculation performed by the title key recalculation unit 623 is equivalent to an inverse calculation of the calculation performed by the title key calculation unit 411 of the key distribution device 400. Accordingly, if the processed UR 430 and the content signature 510 are authorized, the title key recalculation unit 623 can reconstruct the title key generated by the title key calculation unit 411.

The MAC read unit 624 reads, from the recording medium device 700, the MAC corresponding to the content to be played back. The MAC read unit 624 outputs the MAC thus read to the first playback judgment unit 625.

The first playback judgment unit 625 receives the title key from the title key recalculation unit 623, the recording medium device ID from the recording medium device ID acquisition unit 606, and the MAC from the MAC read unit 624. The first playback judgment unit 625 calculates a MAC from the title key and the recording medium device ID thus received. Then, the first playback judgment unit 625 judges whether the MAC thus calculated matches the MAC read by the MAC read unit 624 from the recording medium device 700. If the MACs do not match, the first playback judgment unit 625 outputs an instruction to stop decryption to the content decryption unit 631.

The revocation list reception/storage unit 626 receives the revocation list 160 from the key issuing device 100, and stores therein the revocation list 160.

The content signature verification unit 627 refers to the revocation list 160, and checks whether the signature device 500, which has generated the content signature received from the content signature read unit 622, has been revoked or not. If the signature device 500 has been revoked, the content signature verification unit 627 outputs an instruction to stop decryption to the content decryption unit 631.

Also, the content signature verification unit 627 checks whether the signature data recorded in the signature data region 431 of the processed UR 430 received from the UR read unit 621 matches the signature data recorded in the signature data region 512 of the content signature 510. If these pieces of signature data do not match, the content signature verification unit 627 outputs an instruction to stop decryption to the content decryption unit 631.

The content read unit 628 reads the content to be played back from the recording medium device 700. The content read unit 628 outputs the content thus read to the second playback judgment unit 629 and the content decryption unit 631.

The second playback judgment unit 629 receives the content signature 510 from the content signature read unit 622, and the content from the content read unit 628. The second playback judgment unit 629 checks the authenticity of the content, with use of the content signature 510. If the content is judged to be unauthorized, the second playback judgment unit 629 outputs an instruction to stop decryption to the content decryption unit 631.

The third playback judgment unit 630 receives the processed UR 430 from the UR read unit 621, and the content signature 510 from the content signature read unit 622. The third playback judgment unit 630 calculates a hash value of the content signature 510 on the whole, and checks whether the hash value thus calculated matches the hash value recorded in the content signature hash value region 433 of the processed UR 430. If the hash values do not match, the third playback judgment unit 630 outputs an instruction to stop decryption to the content decryption unit 631.

The content decryption unit 631 receives the title key reconstructed by the title key recalculation unit 623, and the content from the content read unit 628. The content decryption unit 631 decrypts the content, by applying a decryption algorithm D to the content with use of the title key as a decryption key. The decryption algorithm D is an algorithm for decrypting ciphertext generated with use of the encryption algorithm E into plaintext. The content decryption unit 631 outputs the content thus decrypted to the content playback unit 632.

The content decryption unit 631 stops decryption of the content if receiving a signal indicating the instruction to stop decryption from any of the first playback judgment unit 625, the content signature verification unit 627, the second playback judgment unit 629, and the third playback judgment unit 630.

The content playback unit 632 receives the content decrypted by and transmitted from the content decryption unit 631, and decodes the content. Then, the content playback unit 632 outputs the content thus decoded to a display device (not shown).

<7-2. Operations of Content Recording Processing>

Figure 22:
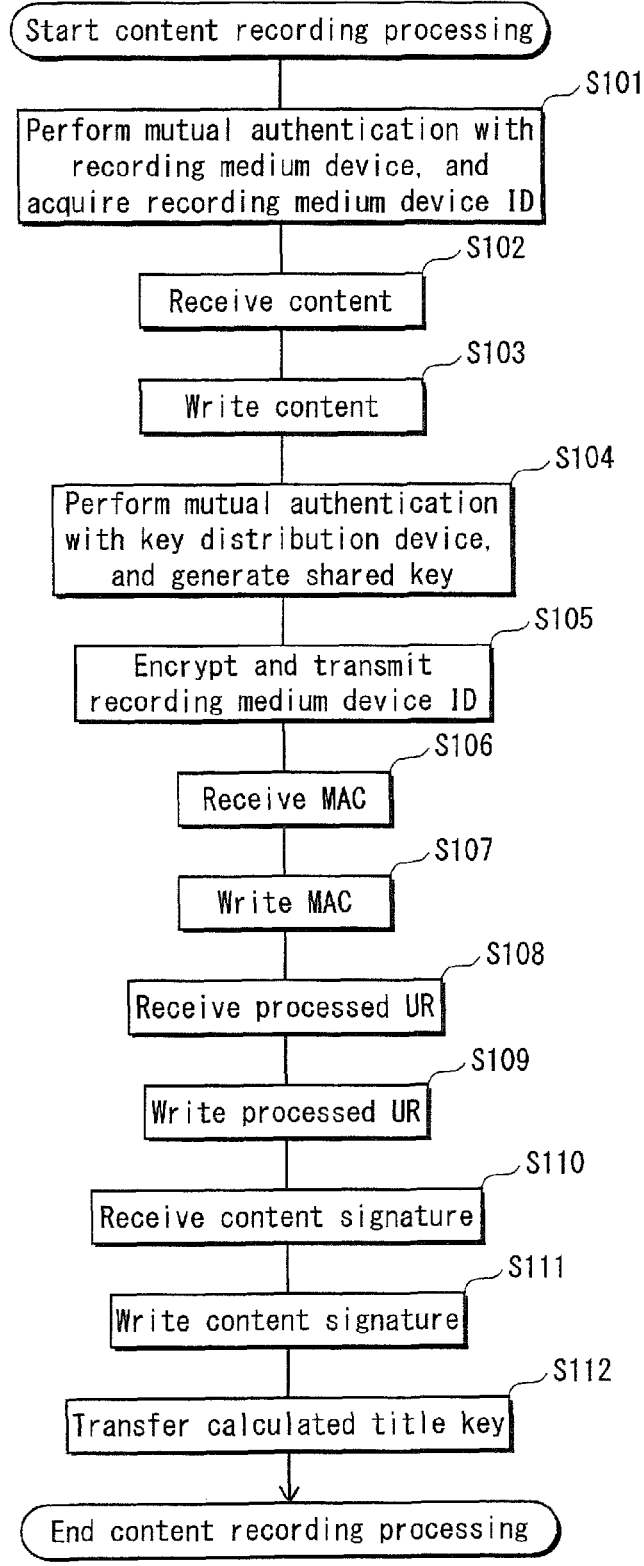
FIG. 22 is a flowchart showing operations of content recording processing.

FIG. 22 is a flowchart showing operations of the content recording processing by the terminal device 600.

Note that the terminal device 600 stores therein, in advance, the root public key, the terminal device private key, and the terminal device certificate 140.

The mutual authentication unit 605 performs mutual authentication with the recording medium device 700, and verifies the authenticity of the recording medium device 700. The recording medium device ID acquisition unit 606 acquires the recording medium device ID from the recording medium device certificate 150 received during the mutual authentication processing (step S101).

The content reception unit 603 receives the content from the content distribution device 300 (step S102). The content writing unit 604 writes the content received in step S102 into the recording medium device 700 (step S103).

Subsequently, the mutual authentication unit 605 performs mutual authentication with the key distribution device 400, verifies the authenticity of the key distribution device 400, and shares the shared key BK1 with the key distribution device 400 (step S104). The encryption/decryption unit 608 encrypts the recording medium device ID acquired in step S101 with use of the shared key BK1, and transmits the recording medium device ID to the key distribution device 400 (step S105).

Next, the MAC/UR/content signature reception unit 609 receives the MAC from the key distribution device 400 (step S106), and the MAC/UR/content signature writing unit 610 writes the MAC into the recording medium device 700 (step S107).

Also, the MAC/UR/content signature reception unit 609 receives the processed UR 430 from the key distribution device 400 (step S108), and the MAC/UR/content signature writing unit 610 writes the processed UR 430 into the recording medium device 700 (step S109).

Also, the MAC/UR/content signature reception unit 609 receives the content signature 510 from the key distribution device 400 (step S110), and the MAC/UR/content signature writing unit 610 writes the content signature 510 into the recording medium device 700 (step S111).

Subsequently, the calculated title key transfer unit 611 transfers the calculated title key received from the key distribution device 400 to the recording medium device 700 (step S112). Note that the calculated title key transferred in step S112 is encrypted with use of the shared key BK3, which is shared between the key distribution device 400 and the recording medium device 700 and not known by the terminal device 600.

<7-3 Operations of Content Playback Processing>

Figure 23:
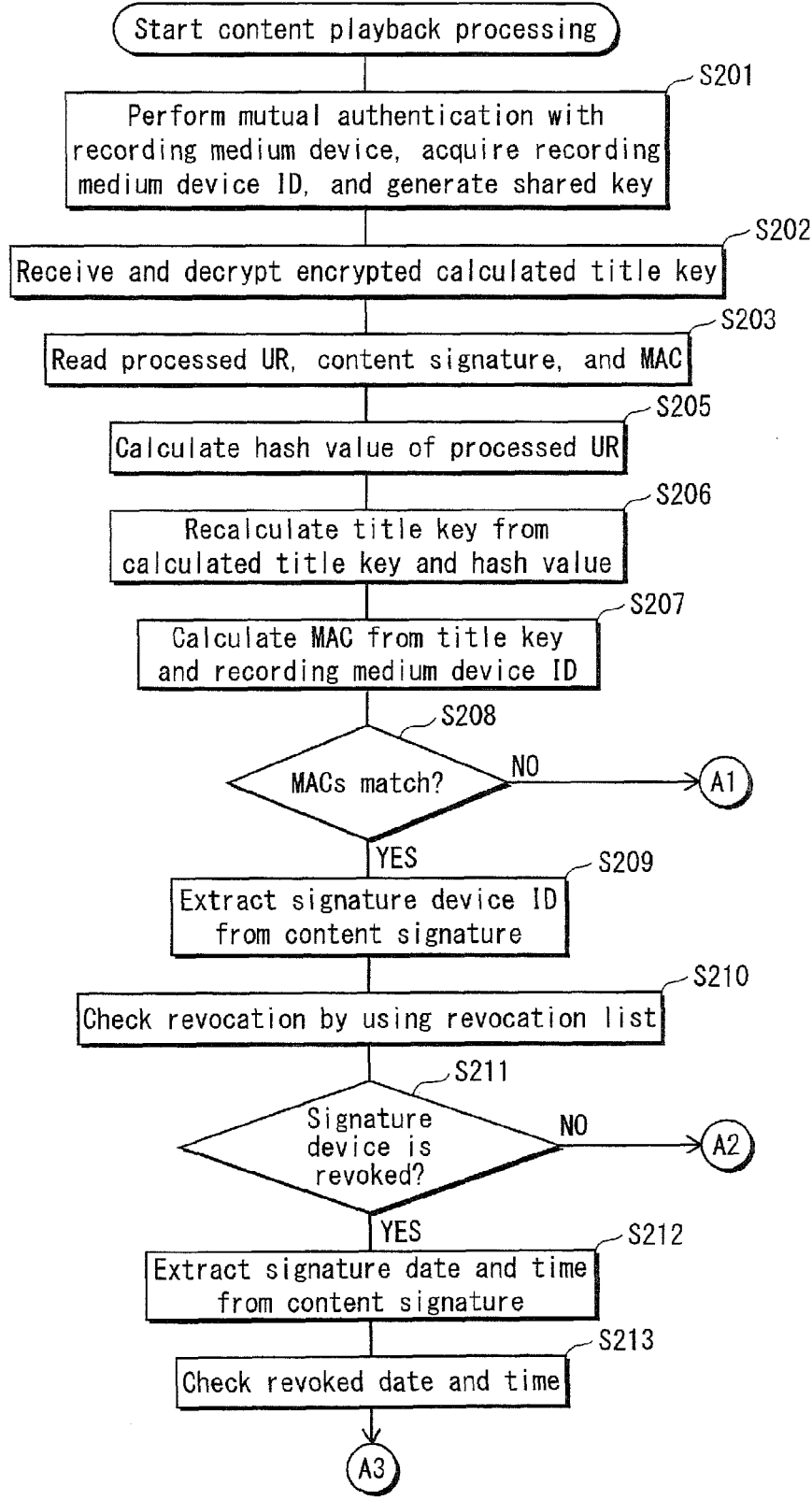
FIG. 23 is a flowchart showing operations of content playback processing.
Figure 24:
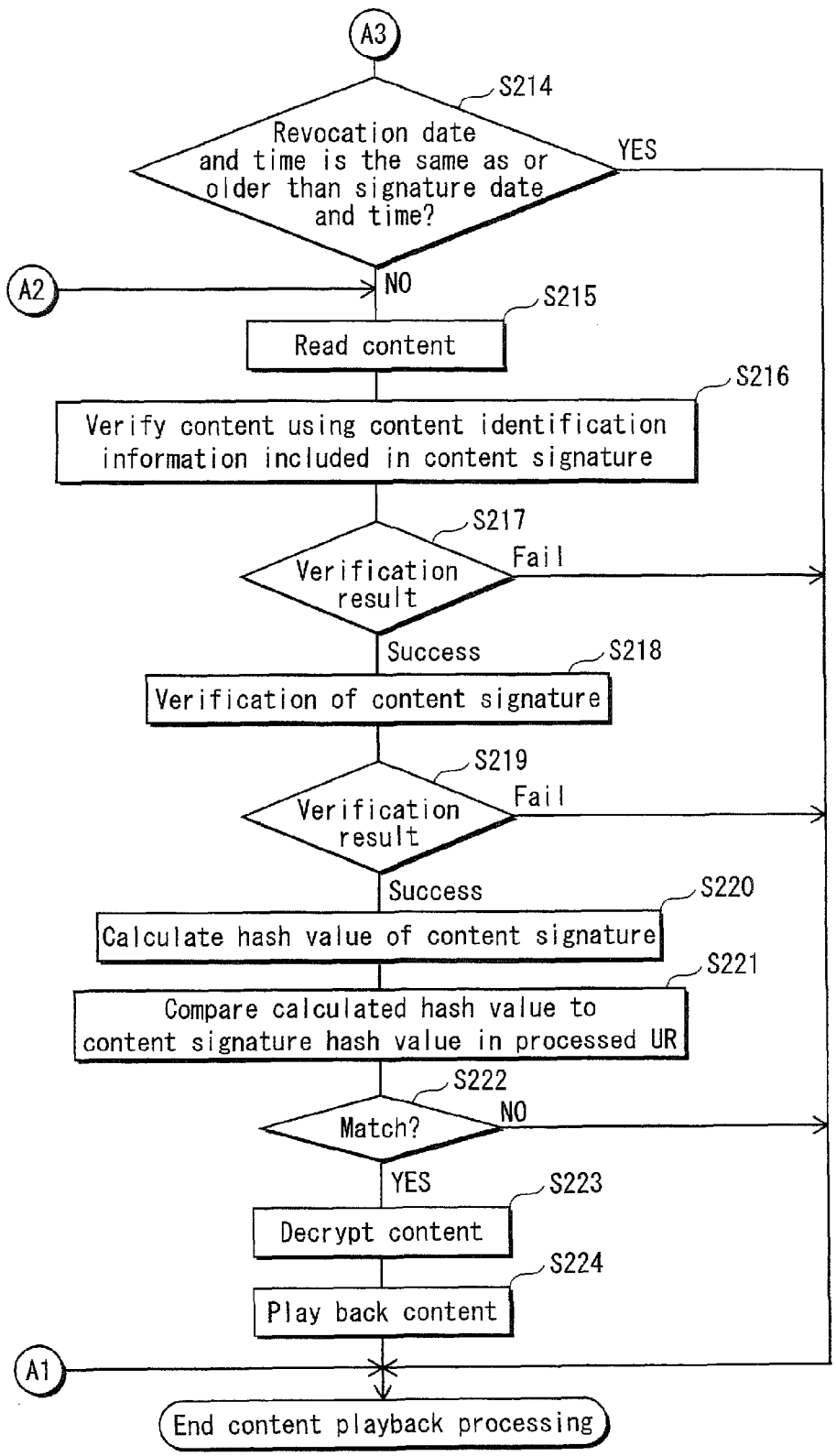
FIG. 24 is a flowchart showing operations of the content playback processing.

FIG. 23 is a flowchart showing operations of the content playback processing by the terminal device 600. Note that the recording medium device 700 has already stored therein the content, the calculated title key, the MAC, the processed UR, the content signature, etc., through the content recording processing described above.

The mutual authentication unit 605 performs mutual authentication processing with the recording medium device 700, and shares the shared key BK3. The recording medium device ID acquisition unit 606 acquires the recording medium device ID from the recording medium device certificate 150 received during the mutual authentication processing (step S201). The recording medium device ID acquisition unit 606 outputs the recording medium device ID thus acquired to the first playback judgment unit 625.

Subsequently, the encryption/decryption unit 608 receives, from the recording medium device 700, the calculated title key encrypted with use of the shared key BK3, and decrypts the encrypted calculated title key with use of the shared key BK3 (step S202). The encryption/decryption unit 608 outputs the calculated title key thus decrypted to the calculated title key reception unit 620. The calculated title key reception unit 620 receives the calculated title key, and outputs the calculated title key to the title key recalculation unit 623.

Next, the UR read unit 621 reads the processed UR 430 from the recording medium device 700, and outputs the processed UR 430 to the title key recalculation unit 623 and the third playback judgment unit 630. The content signature read unit 622 reads the content signature 510 from the recording medium device 700, and outputs the content signature 510 to the title key recalculation unit 623, the content signature verification unit 627, the second playback judgment unit 629, and the third playback judgment unit 630. The MAC read unit 624 reads the MAC from the recording medium device 700, and outputs the MAC to the first playback judgment unit 625 (step S203).

The title key recalculation unit 623 calculates a hash value of the processed UR 430 (step S205). Then, the title key recalculation unit 623 performs an exclusive OR (XOR) operation on the hash value of the processed UR 430 and the calculated title key, and thereby calculates a title key (step S206). The title key recalculation unit 623 outputs the title key thus calculated to the first playback judgment unit 625 and the content decryption unit 631.

Subsequently, the first playback judgment unit 625 calculates a MAC from the title key and the recording medium device ID (step S207). The first playback judgment unit 625 judges whether the MAC calculated in step S207 matches the MAC read from the recording medium device 700 in step S203.

If the MACs do not match ("NO" in step S208), the first playback judgment unit 625 outputs an instruction to stop decryption to the content decryption unit 631. Then, the terminal device 600 ends the content playback processing.

If the MACs match ("YES" in step S208), the content signature verification unit 627 extracts the signature device ID from the signature device certificate 130 recorded in the signature device certificate region 514 of the content signature 510 (step S209). The content signature verification unit 627 checks whether the signature device ID extracted in step S209 is included in the revocation list 160 stored in the revocation list reception/storage unit 626 (step S210).

If the signature device ID is not included in the revocation list 160 ("NO" in step S211), the processing proceeds to step S215. If the signature device ID is included in the revocation list 160 ("YES" in step S211), the content signature verification unit 627 extracts the signature date and time from the signature date/time region 513 of the content signature 510 (step S212). The content signature verification unit 627 checks the revocation date and time associated with the signature device ID in the revocation list 160 (step S213).

If the revocation date and time is the same as or older than the signature date and time ("YES" in step S214), the content signature verification unit 627 outputs an instruction to stop decryption to the content decryption unit 631. Then, the terminal device 600 ends the content playback processing.

If the revocation date and time is more recent than the signature date and time ("NO" in step S214), the content read unit 628 reads content from the recording medium device 700 (step S215). The content read unit 628 outputs the content thus read to the second playback judgment unit 629 and the content decryption unit 631.

The second playback judgment unit 629 divides the content received from the content read unit 628 into N partial contents. Then, the second playback judgment unit 629 arbitrarily selects seven partial contents from among the N partial contents, and calculates a hash value of each of the seven partial contents.

The second playback judgment unit 629 reads hash values corresponding to the seven partial contents thus selected, from the content identification information (i.e., hash table) 311 included in the content signature 510 received from the content signature read unit 622. Then, the second playback judgment unit 629 verifies whether the content read from the recording medium device 700 is authorized, by comparing the calculated hash values to the hash values read from the content identification information 311 (step S216).

If at least one of the seven hash values does not match ("Fail" in step S217), the second playback judgment unit 629 outputs an instruction to stop decryption to the content decryption unit 631. Then, the terminal device 600 ends the content playback processing.

If all of the seven hash values match ("Success" in step S217), the second playback judgment unit 629 reads, from the content identification information 311, the rest of the hash values (i.e., N-7 hash values) which are hash values other than the seven hash values calculated from the content read from the recording medium device 700. The second playback judgment unit 629 generates a hash table for verification by combining the N-7 hash values read from the content identification information 311 and the seven hash values calculated from the content.

The second playback judgment unit 629 extracts the signature device public key from the signature device certificate region 514 of the content signature 510. The second playback judgment unit 629 generates verification data by applying a signature verification algorithm V to the hash table for verification, with use of the signature device public key as a verification key. The signature verification algorithm V is an algorithm for verifying signature data generated by a signature generation algorithm S.

The second playback judgment unit 629 checks whether the verification data thus generated matches the signature data recorded in the signature data region 512 of the content signature 510 (step S218).

If the verification data does not match the signature data ("Fail" in step S219), the second playback judgment unit 629 outputs an instruction to stop decryption to the content decryption unit 631. Then, the terminal device 600 ends the content playback processing.

If the verification data matches the signature data ("Success" in step S219), the third playback judgment unit 630 checks whether the processed UR 430 read from the recording medium device 700 has been generated with use of the content signature 510 that is authorized.

Specifically, the third playback judgment unit 630 calculates a hash value of the content signature 510 (step S220), and compares the hash value thus calculated to the hash value recorded in the content signature hash value region 433 of the processed UR 430 (step S221).

If the hash values do not match ("NO" in step S222), the third playback judgment unit 630 outputs an instruction to stop decryption to the content decryption unit 631. Then, the terminal device 600 ends the content playback processing.

If the hash values match ("YES" in step S222), the content decryption unit 631 decrypts the content by applying the decryption algorithm D to the content with use of the title key as a decryption key (step S223).

The content playback unit 632 decodes the content and outputs the decoded content to the display device (step S224).

<8. Recording Medium Device 700>

The following describes the recording medium device 700 in detail. The recording medium device 700 is an SD memory card used by being inserted in the terminal device 600.

<8-1. Structure of Recording Medium Device 700>

Figure 25:
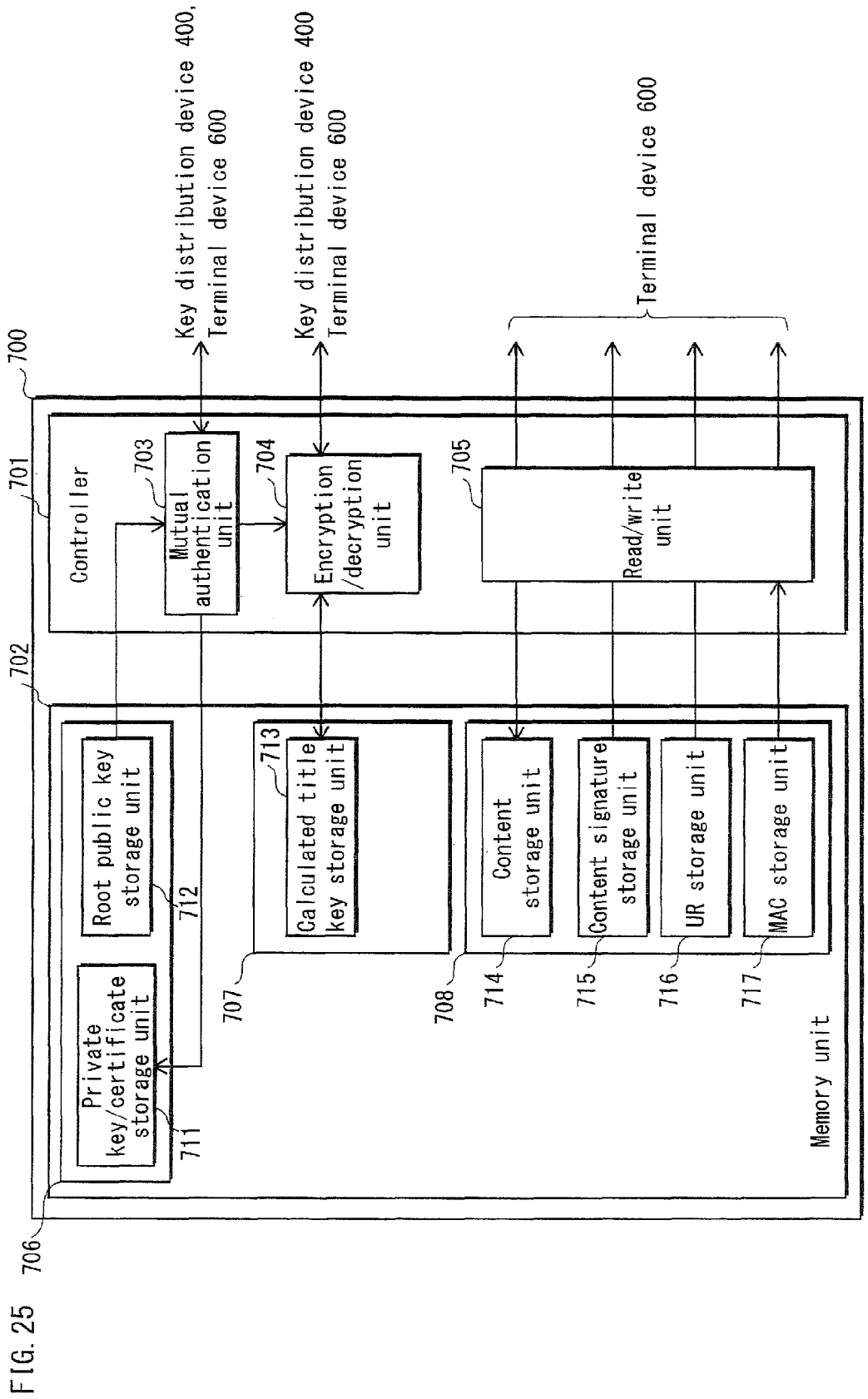
FIG. 25 is a block diagram showing a recording medium device 700.

FIG. 25 is a block diagram showing a functional structure of the recording medium device 700.

As shown in FIG. 25, the recording medium device 700 includes a controller 701 and a memory unit 702.

The controller 701 is an LSI device manufactured by a controller manufacturer. The internal processing by the controller 701 is securely protected, so that information stored in the controller 701 cannot be read by an external device.

The memory unit 702 is a flash memory manufactured by a flash memory manufacturer. Writing of data to the memory unit 702 and reading of data from the memory unit 702 are performed via the controller 701. Specifically, the memory unit 702 includes a system region 706, an authorized region 707 and a regular region 708. The system region 706 is accessible only by the controller 701 (i.e., only the controller 701 is permitted to read/write data from/to the system region 706), and not accessible by a device external to the controller 701. Accessing the authorized region 707 requires authentication processing via the controller 701. The regular region 708 does not need authentication processing and is freely accessible by an external device via the controller 701.

The controller 701 includes a mutual authentication unit 703, an encryption/decryption unit 704, and a read/write unit 705.

The mutual authentication unit 703 performs mutual authentication with the key distribution device 400, and shares the shared key BK2 therewith. Also, the mutual authentication unit 703 performs mutual authentication with the terminal device 600, and shares the shared key BK3 therewith. The mutual authentication processing and key sharing processing are described above with reference to FIGS. 15 and 16; therefore, descriptions thereof are omitted here.

The encryption/decryption unit 704 encrypts and decrypts data exchanged with the key distribution device 400, with use of the shared key BK2 shared with the key distribution device 400. Similarly, the encryption/decryption unit 704 encrypts and decrypts data exchanged with the terminal device 600, with use of the shared key BK3 shared with the terminal device 600.

Specifically, during recording of the content, the encryption/decryption unit 704 receives, via the calculated title key transfer unit 611 of the terminal device 600, the encrypted calculated title key transmitted from the key distribution device 400. The encryption/decryption unit 704 decrypts the encrypted calculated title key thus received to obtain a calculated title key, and stores the calculated title key into the memory unit 702.

Also, during playback of the content, the encryption/decryption unit 704 reads the calculated title key stored in the memory unit 702, encrypts the calculated title key, and transmits the encrypted calculated title key to the terminal device 600.

The read/write unit 705 reads data from the regular region 708, and writes data to the regular region 708.

The system region 706 includes a private key/certificate storage unit 711 and a root public key storage unit 712.

The private key/certificate storage unit 711 stores therein the recording medium device private key and the recording medium device certificate 150 generated by the key issuing device 100.

The root public key storage unit 712 stores therein the root public key generated by the key issuing device 100.

Note that the root public key, the recording medium device private key, and the recording medium device certificate are embedded in the memory unit 702 by a device that manufactures the recording medium device 700, during manufacturing of the recording medium device 700.

The authorized region 707 includes a calculated title key storage unit 713, and stores therein the calculated title key. As described above, accessing the authorized region 707 requires authentication processing via the controller 701. Accordingly, writing and reading of the calculated title key is always performed via the mutual authentication unit 703 and the encryption/decryption unit 704.

The regular region 708 includes a content storage unit 714, a content signature storage unit 715, a UR storage unit 716, and a MAC storage unit 717.

The content storage unit 714 stores the content therein. The content signature storage unit 715 stores the content signature 510 therein. The UR storage unit 716 stores therein the processed UR 430. The MAC storage unit 717 stores the MAC therein.

Note that during recording of the content, the content, the content signature 510, the processed UR 430, and the MAC are received by the read/write unit 705 from the terminal device 600, and are written by the read/write unit 705 to the content storage unit 714, the content signature storage unit 715, the UR storage unit 716, and the MAC storage unit 717, respectively.

Also, in response to a read request from the terminal device 600 during playback of the content, the content, the content signature 510, the processed UR 430, and the MAC are read by the read/write unit 705 from the content storage unit 714, the content signature storage unit 715, the UR storage unit 716, and the MAC storage unit 717, respectively. The content, the content signature 510, the processed UR 430, and the MAC thus read are then transmitted to the terminal device 600.

<9. Modification>

Although having been described based on the above embodiment, the present disclosure is not limited to the content distribution system exemplified above. For example, the content distribution system may be modified as follows.

(1) According to the above embodiment, the key distribution device 400 and the signature device 500 are two independent devices. However, the key distribution device 400 and the signature device 500 may be realized as one single device.

(2) According to the above embodiment, the content creation device 200 and the content distribution device 300 are two independent devices. However, the content creation device 200 and the content distribution device 300 may be realized as one single device.

Also, the title key generation unit 302, the encryption unit 303, the content identification information generation unit 305, and the title key/content identification information transmission unit 306 included in the content distribution device 300 shown in FIG. 9 may be included in the content creation device 200 instead of the content distribution device 300, and functions achieved by these function blocks may be realized by the content creation device 200.

(3) In the above Embodiment, an SD memory card is used as a specific example of the recording medium device 700.

However, the recording medium device 700 is not limited to being an SD memory card. The recording medium device 700 may be a device composed of a storage device, such as an HDD, and a control LSI. Also, the recording medium device 700 is not limited to a removable device such as an SD memory card. The recording medium device 700 may be a device composed of an internal memory, such as in a mobile telephone, eBook, or NetBook, and a control LSI.

(4) Also, in the above Embodiment, a PC is used as a specific example of the terminal device 600. However, the terminal device 600 is not limited to a PC. For example, the terminal device 600 may be a mobile terminal such as a smartphone, and a tablet terminal. Also, the terminal device 600 may be a so-called KIOSK terminal located at a shop such as a convenience store. Also, the terminal device 600 may be a reception device for receiving digital television broadcasts. The terminal device 600 may be any device as long as the device is connectable to at least a network such as the Internet or a television broadcasting network, and has a function of acquiring the content, the title key, the content signature, the UR, etc. via the network and recording these pieces of information into the recording medium device 700.

(5) According to the above Embodiment, the terminal device 600 acquires the recording medium device ID during the mutual authentication processing with the recording medium device 700. However, the recording medium device ID may be acquired differently.

For example, the authorized region 707 of the recording medium device 700 may store therein the recording medium device ID for uniquely identifying the recording medium device 700. In this case, the terminal device 600 may perform mutual authentication with the recording medium device 700, and share the shared key BK3 with the recording medium device 700. Thereafter, the terminal device 600 may receive, from the recording medium device 700, an encrypted recording medium device ID which is the recording medium device ID encrypted with use of the shared key BK3. The terminal device 600 may decrypt the encrypted recording medium device ID thus received with use of the shared key BK3, and thereby acquire the recording medium device ID.

(6) The mutual authentication processing described in the above Embodiment may additionally include the following process.

Each of the key distribution device 400, the terminal device 600, and the recording medium device 700 acquires in advance, from the key issuing device 100, the revocation list 160 including the device IDs of the respective devices whose private keys have been exposed (i.e., revoked devices). Then, each of the devices 400, 600, and 700 receives the public key certificate of a partner device during the mutual authentication processing with the partner device, extracts the device ID from the public key certificate, and judges whether the extracted device ID is included in the revocation list. If the device ID extracted from the public key certificate is included in the revocation list, in other words, if the partner device has been revoked, the mutual authentication processing is ended.

Figure 26:
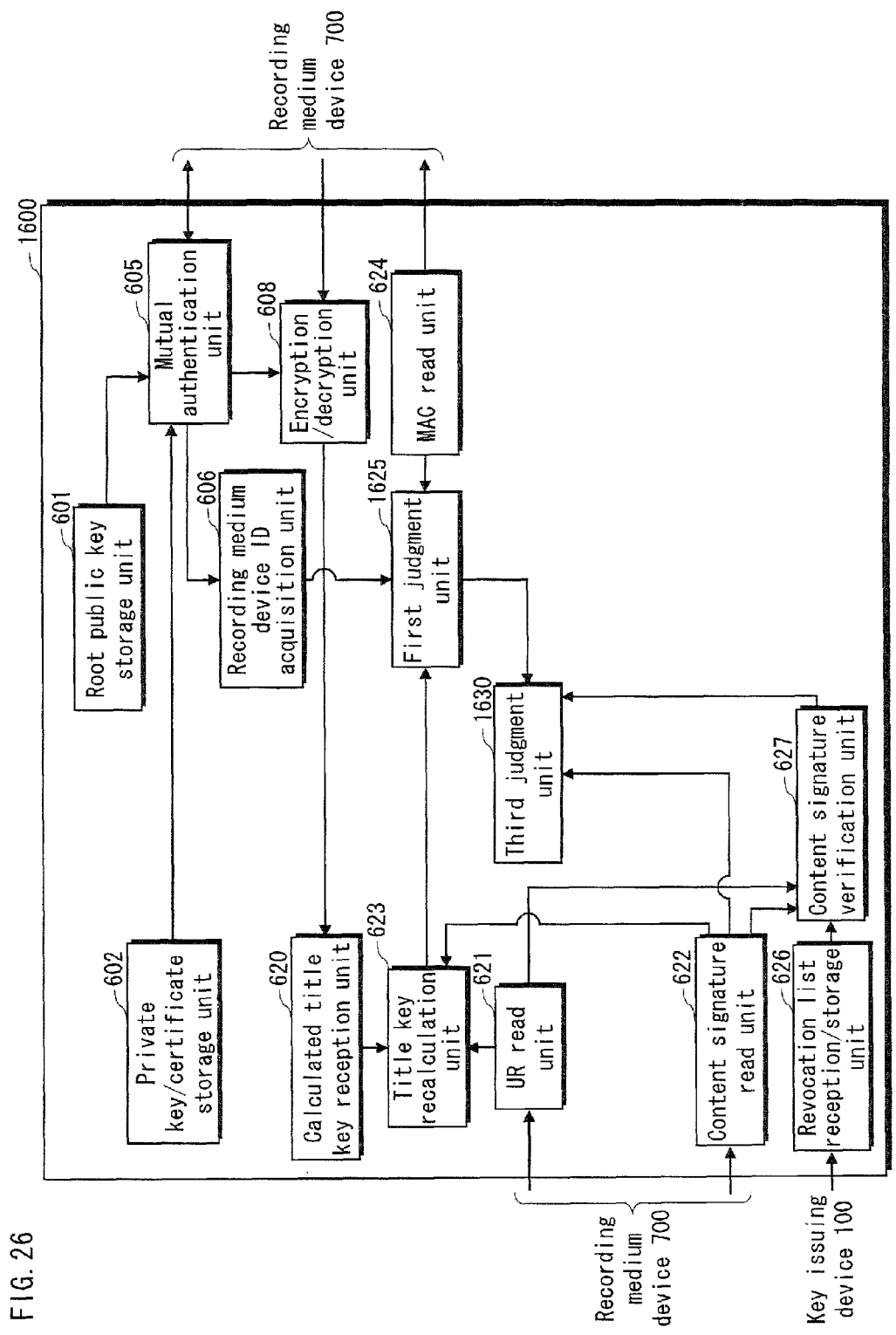
FIG. 26 is a block diagram showing a verification device 1600.

(7) The following describes a verification device 1600 according to a modification of the terminal device 600 described above, with reference to FIG. 26. As shown in FIG. 26, the verification device 1600 includes the root public key storage unit 601, the private key/certificate storage unit 602, the mutual authentication unit 605, the recording medium device ID acquisition unit 606, the encryption/decryption unit 608, the calculated title key reception unit 620, the UR read unit 621, the content signature read unit 622, the title key recalculation unit 623, the MAC read unit 624, a first judgment unit 1625, the revocation list reception/storage unit 626, the content signature verification unit 627, and a third judgment unit 1630. Here, the components having the same functions as those included in the terminal device 600 are provided with the same reference signs as in FIGS. 20 and 21.

The verification device 1600 does not have functions relating to the decryption and playback of content.

The first judgment unit 1625 receives the title key from the title key recalculation unit 623, the recording medium device ID from the recording medium device ID acquisition unit 606, and the MAC from the MAC read unit 624, similarly to the first playback judgment unit 625. The first judgment unit 1625 calculates a MAC from the title key and the recording medium device ID thus received. Then, the first judgment unit 1625 judges whether the MAC thus calculated matches the MAC read by the MAC read unit 624 from the recording medium device 700. The first judgment unit 1625 outputs a result of the judgment.

The third judgment unit 1630 receives the processed UR 430 from the UR read unit 621, and the content signature from the content signature read unit 622, similarly to the third playback judgment unit 630. The third judgment unit 1630 calculates a hash value of the content signature on the whole, and judges whether the hash value thus calculated matches the hash value recorded in the content signature hash value region 433 of the processed UR 430. The third judgment unit 1630 outputs a result of the judgment.

As described above, the verification device 1600 not having the functions relating to the decryption and playback of content is also included in one aspect of the present disclosure.

Also, one aspect of the present disclosure may be a verification device comprising: a read unit configured to read encrypted content and a content signature from a recording medium device, and to read a converted title key from a protected area of the recording medium device, the converted title key having been converted from a title key with use of a content signature generated by an authorized signature device; and a content signature verification unit configured to judge whether the content signature read by the read unit matches the content signature generated by the authorized signature device.

Here, the content signature verification unit of the verification device may output a result of the judgment to an external device. Further, the verification device may be connected to a control device that receives the result of the judgment output from the content signature verification unit, and performs processing based on the result of the judgment. Specifically, the control device performs decryption of the encrypted content, moving of the encrypted content, etc., based on the result of the judgment. In other words, the control device does not perform such processing as decryption of the encrypted content and moving of the encrypted content if the content signatures do not match, but performs the said processing only if the content signatures match.

(8) The content signature reception unit 408 of the key distribution device 400 in the above Embodiment may verify the content signature 510 received from the signature device 500 as follows.

The content signature reception unit 408 refers to the revocation list 160 held in the revocation list reception unit 409, and judges whether the signature device ID is included in the revocation list 160. If the signature device ID is included in the revocation list 160, the content signature reception unit 408 compares the signature date and time included in the content signature 510 to the revocation date and time associated with the signature device ID in the revocation list 160. If the signature date and time included in the content signature 510 is the same as or more recent than the revocation date and time included in the revocation list 160, the content signature reception unit 408 judges that the content signature 510 has been revoked.

If the signature date and time included in the content signature 510 is older than the revocation date and time included in the revocation list 160, the content signature reception unit 408 further judges whether the signature date and time included in the content signature 510 greatly differs from the date and time on which the content signature 510 was received.

For example, the content signature reception unit 408 judges whether there is a delay of 48 hours or longer between the signature date and time and the current date and time. If judging that there is a delay of 48 hours or longer between the signature date and time and the current date and time, the content signature reception unit 408 judges that the received content signature 510 has been revoked.

(9) According to the above Embodiment, the UR processing unit 410 calculates a hash value of the content signature 510 received by the content signature reception unit 408, and adds the hash value of the content signature 510 to the UR 210 received by the UR reception unit 407.

The key distribution device 400 having the above structure may be modified as follows.

Figure 27:
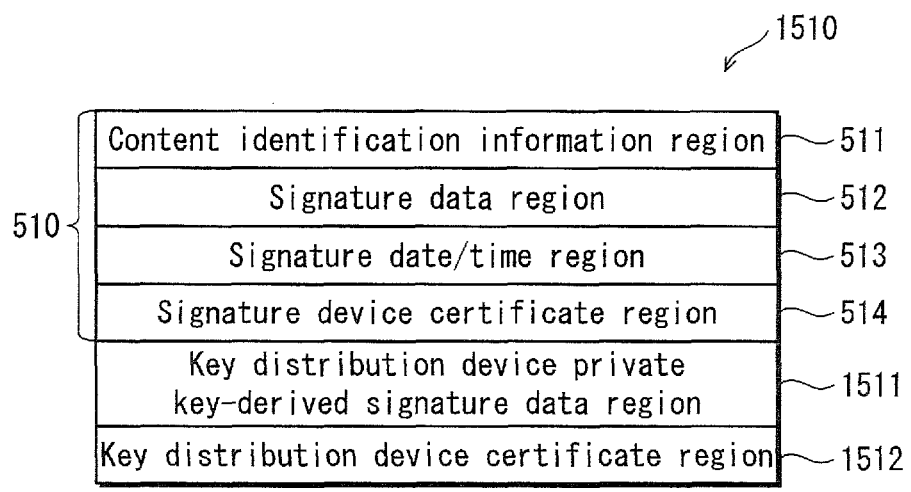
FIG. 27 is the data structure of a signed content signature 1510.

The key distribution device 400 may include an additional signature unit instead of the UR processing unit 410. The additional signature unit generates a signed content signature 1510 shown in FIG. 27, from the content signature 510 received by the content signature reception unit 408.

The additional signature unit generates signature data by applying a signature generation algorithm to the content signature 510 (i.e., data obtained by concatenating pieces of data recorded in the content identification information region 511, the signature data region 512, the signature date/time region 513, and the signature device certificate region 514) with use of the key distribution device private key stored in the private key/certificate storage unit 404 as a signature key. Then, the additional signature unit records the signature data thus generated to a key distribution device private key-derived signature data region 1511 in the signed content signature 1510. Furthermore, the additional signature unit records, to a key distribution device certificate region 1512, the key distribution device certificate 120 stored in the private key/certificate storage unit 404.

In this way, the additional signature unit modifies the content signature 510 received by the content signature reception unit 408 to generate the signed content signature 1510. The key distribution device 400 transmits the signed content signature 1510 generated by the additional signature unit to the terminal device 600, instead of transmitting the content signature 510 to the terminal device 600.

Upon receiving the signed content signature 1510 from the key distribution device 400, the terminal device 600 records the signed content signature 1510 to the regular region 708 of the recording medium device 700.

In the case of using the signed content signature 1510 instead of the processed UR, the terminal device 600 omits the aforementioned judgment processing by the third playback judgment unit 630 during the content playback processing. Instead, the second playback judgment unit 629 additionally performs the following processing.

The second playback judgment unit 629 generates verification data by applying a signature verification algorithm to concatenated data obtained by concatenating the pieces of data recorded in the content identification information region 511, the signature data region 512, the signature date/time region 513, and the signature device certificate region 514, with use of, as a verification key, the key distribution device public key included in the key distribution device certificate 120 recorded in the key distribution device certificate region 1512. The second playback judgment unit 629 checks whether the verification data thus generated matches the signature data recorded in the key distribution device private key-derived signature data region 1511.

If the signature verification is successful, the terminal device 600 continues the content playback processing. If the signature verification fails, the second playback judgment unit 629 outputs an instruction to stop decryption to the content decryption unit 631. Then, the terminal device 600 ends the content playback processing.

(10) According to the above Embodiment, the first playback judgment unit 625 of the terminal device 600 judges whether playback of the content is permitted, with use of the MAC generated based on the ID of the recording medium device 700. However, information used for the judgment of whether playback is permitted is not limited to the MAC. For example, it is possible to use a result of an XOR operation performed on the calculated title key and the identification information of the recording medium device. Also, it is possible to use a result of an XOR operation performed on the calculated title key and a hash value of the identification information of the recording medium device. Furthermore, it is possible to use data obtained by providing the identification information of the recording medium device 700 with the signature of the key issuing device 100. In this case, the terminal device 600 can judge whether playback of the content is permitted, by performing an XOR operation or performing a signature verification.

(11) According to the above Embodiment, the second playback judgment unit 629 of the terminal device 600 arbitrarily selects seven partial contents from among the N partial contents, and calculates a hash value of each of the seven partial contents. This makes it possible to reduce the amount of calculation by the second playback judgment unit 629.

However, the second playback judgment unit 629 may select a larger number of partial contents than seven, and calculate a hash value of each of the partial contents thus selected, in order to improve the accuracy of the authenticity verification of the content. Alternatively, the second playback judgment unit 629 may select a smaller number of partial contents than seven, and calculate a hash value of each of the partial contents thus selected, in order to further reduce the amount of calculation.

(12) According to the above Embodiment, the third playback judgment unit 630 of the terminal device 600 calculates a hash value of the content signature 510, and compares the hash value thus calculated to the hash value recorded in the content signature hash value region of the processed UR.

However, this structure is merely one example. It suffices for the third playback judgment unit 630 to check whether information for specifying the content signature 510 is correctly embedded in the processed UR 430.

For example, the third playback judgment unit 630 may check whether the signature data recorded in the signature data region 431 of the processed UR 430 read by the UR read unit 621 matches the signature data recorded in the signature data region 512 of the content signature 510 read by the content signature read unit 622.

(13) According to the above Embodiment, the first playback judgment unit 625, the content signature verification unit 627, the second playback judgment unit 629, and the third playback judgment unit 630 outputs an instruction to stop decryption to the content decryption unit 631, depending on a judgment result. However, this structure is merely one example. To prevent playback of the content, the first playback judgment unit 625, the content signature verification unit 627, the second playback judgment unit 629, and the third playback judgment unit 630 may output an instruction to stop decoding to the content playback unit 632, depending on a judgment result. Alternatively, the first playback judgment unit 625 may output an instruction to stop reading to the content read unit 628, depending on a judgment result.

(14) According to the above Embodiment, one example of the content is a movie consisting of video data and audio data. However, the content is of course not limited to a movie. For example, the content may be a still image such as JPEG data, a computer program, a computer game, music content without video data, or text data.

(15) It is possible to record a control program onto a recording medium and distributing the recording medium or to distribute the control program via any of various communication channels, the control program being composed of program codes written in a machine language or a high-level language for causing (i) the processors of the key distribution device and the terminal device and (ii) various circuits connected to the processors to perform the key distribution processing and the content playback processing described in the above Embodiment. Examples of such a recording medium include an IC card, a hard disk, an optical disc, a flexible disk, a ROM, and a flash memory. The control program thus distributed becomes available for use by being stored in a processor-readable memory or the like. The functions described in the above Embodiment are realized by a processor executing the control program. The processor may directly execute the control program. Alternatively, the processor may execute the control program after compiling it, or execute the control program with use of an interpreter.

(16) Each of the components of the respective devices described in the above Embodiment (e.g., the root public key storage unit 601, the private key/certificate storage unit 602, the content reception unit 603, the content writing unit 604, the mutual authentication unit 605, the recording medium device ID acquisition unit 606, the recording medium device ID transmission unit 607, the encryption/decryption unit 608, the MAC/UR/content signature reception unit 609, the MAC/UR/content signature writing unit 610, the calculated title key transfer unit 611, the calculated title key reception unit 620, the UR read unit 621, the content signature read unit 622, the title key recalculation unit 623, the MAC read unit 624, the first playback judgment unit 625, the revocation list reception/storage unit 626, the content signature verification unit 627, the content read unit 628, the second playback judgment unit 629, the third playback judgment unit 630, the content decryption unit 631, the content playback unit 632, etc.) may be realized by a circuit that performs the function of the component or by a program for realizing the function being executed by one or more processors. Also, the key distribution device and the terminal device described in the above Embodiment may be realized as integrated circuit packages such as ICs, LSIs or the like. These packages are incorporated into various devices, whereby the devices realize the functions described in the above Embodiment.

(17) The Embodiment and modifications described above may be appropriately combined.

<10. Supplementary Remarks>

The following describes the structures of a terminal device, a verification device, and a key distribution device as other aspects of the present disclosure, and also describes modifications and effects thereof.

(a) One aspect of the present disclosure is a terminal device comprising: a read unit configured to read encrypted content and a content signature from a recording medium device, and to read a converted title key from a protected area of the recording medium device, the converted title key having been converted from a title key with use of a content signature generated by an authorized signature device; a title key reconstruction unit configured to generate a reconstructed title key by reversely converting the converted title key with use of the content signature read by the read unit; and a playback unit configured to decrypt the encrypted content with use of the reconstructed title key to obtain decrypted content, and to play back the decrypted content.

According to this structure, the converted title key is recorded in the protected area of the recording medium device. The converted title key is the title key converted with use of the content signature generated by the authorized signature device. Therefore, even if a malicious act is conducted whereby a content signature generated with use of a leaked signature key and unauthorized encrypted content are recorded into the recording medium device, the terminal device cannot reconstruct the correct title key from the converted title key read from the recording medium device. If the correct title key cannot be reconstructed, the terminal device cannot correctly decrypt the unauthorized encrypted content. This prevents the terminal device from playing back the unauthorized encrypted content, thus preventing malicious use of content.

Distribution of unauthorized content unplayable in the terminal device is meaningless. This may possibly prevent the malicious act per se whereby unauthorized content pretending to be authorized content with use of a leaked signature key is recorded into the recording medium device.

(b) Here, the converted title key may have been generated from the content signature generated by the authorized signature device, a usage condition of the encrypted content, and the title key, the read unit may be further configured to read the usage condition from the recording medium device, and the title key reconstruction unit may generate the reconstructed title key by reversely converting the converted title key with use of the content signature read by the read unit and the usage condition.

According to this structure, if a malicious user records an unauthorized usage condition into the recording medium device, the terminal device cannot reconstruct the correct title key from the converted title key. This prevents the terminal device from playing back the unauthorized encrypted content, thus preventing malicious use of content.

(c) Here, the converted title key may have been generated as a result of a predetermined calculation performed on first concatenated data and the title key, the first concatenated data being obtained by concatenating the content signature generated by the authorized signature device and the usage condition, and the title key reconstruction unit may generate the reconstructed title key, by generating second concatenated data from the content signature read by the read unit and the usage condition, and performing an inverse calculation of the predetermined calculation on the second concatenated data and the converted title key.

According to this structure, if a usage condition and a content signature recorded in the recording medium device by a malicious user are different from the authorized usage condition and the authorized content signature by even one bit, the terminal device cannot reconstruct the correct title key from the converted title key. This prevents the terminal device from playing back the unauthorized encrypted content, thus preventing malicious use of content.

(d) Here, the terminal device may further comprise a content signature verification unit (i.e., the third playback judgment unit 630 in the above Embodiment) configured to judge whether the content signature read by the read unit matches the content signature generated by the authorized signature device, and if judging negatively, to prevent processing by the playback unit.

If the content signature recorded in the recording medium device is different from the authorized content signature, the encrypted content recorded in the recording medium device is highly likely to be unauthorized. Therefore, the terminal device may include the above structure to prevent playback of unauthorized content.

Also, if the terminal device plays back unauthorized content, a playback error unknown to a user may occur. Suppose that the user does not know that the content recorded on the recording medium device is unauthorized. In such a case, if a playback error occurs in the terminal device, the user is likely to be confused. Therefore, prevention of playback of unauthorized content with the above structure can eliminate in advance the possibility of any playback error occurring in the terminal device.

(e) Here, the terminal device may further comprise a content verification unit (i.e., second playback judgment unit 629 in the above Embodiment) configured to verify, with use of the content signature read by the read unit, whether the encrypted content is authorized, and if judging negatively, to prevent the processing by the playback unit.

According to the above structure, playback of the content is prevented if the encrypted content recorded in the recording medium device does not correspond to the content signature read by the read unit.

(f) Here, the content signature read by the read unit may include an identification information piece for identifying a signature device that has generated the content signature, and the terminal device may further comprise: a reception unit configured to receive a revocation list including one or more identification information pieces respectively identifying one or more devices that have been revoked; and a revocation check unit (i.e., the content signature verification unit 627 in the above Embodiment) configured to check whether the signature device has been revoked with use of the revocation list, and if judging affirmatively, to prevent the processing by the playback unit.

According to the above structure, even if a malicious act is conducted whereby a content signature generated with use of a leaked private key and unauthorized encrypted content are recorded into the recording medium device, the terminal device refrains from playback of the content having attached thereto the content signature generated with use of the leaked private key. This prevents the malicious use of content.

(g) Here, the content signature read by the read unit may further include a first date information piece indicating a date on which the content signature was generated by the signature device, the revocation list may further include one or more second date information pieces associated one-to-one with the one or more identification information pieces respectively identifying the one or more revoked devices, each second date information piece indicating a date on which the corresponding device was revoked, and the revocation check unit may judge that the signature device has been revoked if the identification information piece of the signature device is included in the revocation list and the date indicated by the first date information is the same as or more recent than the corresponding second identification piece, and may judge that the signature device has not been revoked if the identification information piece of the signature device is included in the revocation list and the date indicated by the first date information is older than the corresponding second identification piece.

The above structure enables the playback unit of the terminal device to play back the content having attached thereto the content signature generated before the private key of the signature device is leaked. As a result, the right of a user who has downloaded the content in an authorized manner is protected.

(h) One aspect of the present disclosure may be a verification device comprising: a read unit configured to read encrypted content and a content signature from a recording medium device, and to read a converted title key from a protected area of the recording medium device, the converted title key having been converted from a title key with use of a content signature generated by an authorized signature device; and a content signature verification unit (i.e., the third judgment unit 1630 in the above Embodiment) configured to judge whether the content signature read by the read unit matches the content signature generated by the authorized signature device.

According to the above structure, if a malicious act is conducted whereby a leaked signature key is used for unauthorized encrypted content to generate a content signature, and the content signature and the unauthorized encrypted content are recorded into the recording medium device, the content verification unit judges that the content signature does not match the content signature generated by an authorized signature device. As a result, further processing is not likely to be performed. This prevents processing using the unauthorized encrypted content, thus preventing malicious use of content.

(i) One aspect of the present disclosure is a key distribution device comprising: a content holding unit configured to hold therein encrypted content that is content encrypted with use of a title key; a content signature holding unit configured to hold therein a content signature for verifying whether the encrypted content is authorized; a title key holding unit configured to hold therein the title key; a key generation unit configured to generate a converted title key by converting the title key with use of the content signature; and a recording unit configured to record the encrypted content, the content signature, and the converted title key into a recording medium device.

According to this structure, even if a malicious act is conducted whereby a content signature generated with use of a leaked signature key and unauthorized encrypted content are recorded into the recording medium device, the terminal device for playing back the encrypted content cannot reconstruct the correct title key from the converted title key read from the recording medium device. If the correct title key cannot be reconstructed, the terminal device cannot correctly decrypt the unauthorized encrypted content. This prevents the terminal device from playing back the unauthorized encrypted content, thus preventing malicious use of content.

(j) Here, the key distribution device may further comprise a usage condition holding unit configured to hold therein a usage condition of the content, wherein the key generation unit may generate the converted title key from the content signature, the usage condition, and the title key.

According to this structure, if a malicious user records an unauthorized usage condition into the recording medium device, the terminal device for playing back the encrypted content cannot reconstruct the correct title key from the converted title key. This prevents the terminal device from playing back the unauthorized encrypted content, thus preventing malicious use of the content.

(k) Here, the key generation unit may generate the converted title key by performing a predetermined calculation on concatenated data and the title key, the concatenated data being obtained by concatenating the content signature and the usage condition.

According to this structure, if a usage condition and a content signature recorded in the recording medium device by a malicious user are different from the authorized usage condition and the authorized usage condition by even one bit, the terminal device cannot reconstruct the correct title key from the converted title key. This prevents the terminal device from playing back the unauthorized encrypted content, thus preventing malicious use of content.

[Industrial Applicability]

The present invention is applicable to the industry for manufacturing and marketing terminal devices that record content, a content signature, a UR, a title key, etc. that are distributed via a network onto a recording medium device such as an SD memory card, and is usable as a technique for preventing the terminal devices from playing back unauthorized encrypted content, even if a malicious act is conducted whereby a content signature generated with use of a leaked signature key and unauthorized encrypted content are recorded into the recording medium device.

[Reference Signs List]
- 1 content distribution system
- 100 key issuing device
- 200 content creation device
- 300 content distribution device
- 400 key distribution device
- 401 root public key reception unit
- 402 root public key storage unit
- 403 private key/certificate reception unit
- 404 private key/certificate storage unit
- 405 title key/content identification information reception unit
- 406 content identification information transmission unit
- 407 UR reception unit
- 408 content signature reception unit
- 409 revocation list reception unit
- 410 UR processing unit
- 411 title key calculation unit
- 412 mutual authentication unit
- 413 encryption/decryption unit
- 414 recording medium device ID reception unit
- 415 MAC calculation unit
- 500 signature device
- 501 private key/certificate reception unit
- 502 private key/certificate storage unit
- 503 content identification information reception unit
- 504 signature unit
- 505 content signature transmission unit
- 600 terminal device
- 601 root public key storage unit
- 602 private key/certificate storage unit
- 603 content reception unit
- 604 content writing unit
- 605 mutual authentication unit
- 606 recording medium device ID acquisition unit
- 607 recording medium device ID transmission unit
- 608 encryption/decryption unit
- 609 MAC/UR/content signature reception unit
- 610 MAC/UR/content signature writing unit
- 611 calculated title key transfer unit
- 620 calculated title key reception unit
- 621 UR read unit
- 622 content signature read unit
- 623 title key recalculation unit
- 624 MAC read unit
- 625 first playback judgment unit
- 626 revocation list reception/storage unit
- 627 content signature verification unit
- 628 content read unit
- 629 second playback judgment unit
- 630 third playback judgment unit
- 631 content decryption unit
- 632 content playback unit
- 700 recording medium device
- 1600 verification device

The invention claimed is:

1. A terminal device comprising:
a read unit configured to read encrypted content and a content signature from a recording medium device, and to read a converted title key from a protected area of the recording medium device, the converted title key having been converted and calculated from a parameter of a title key with use of another parameter of the content signature generated by an authorized signature device;
a title key reconstruction unit configured to subsequently generate a reconstructed title key as an authorized title key by reversely converting the converted title key with use of the parameter of said content signature read by the read unit; and
a playback unit configured to decrypt the encrypted content with use of the reconstructed title key which is authorized to obtain decrypted content, and to play back the decrypted content.

2. The terminal device of claim 1 wherein
the converted title key has been generated from the content signature generated by the authorized signature device, a usage condition of the encrypted content, and the title key,
the read unit is further configured to read the usage condition from the recording medium device, and
the title key reconstruction unit generates the reconstructed title key by reversely converting the converted title key with use of the content signature read by the read unit and the usage condition.

3. The terminal device of claim 2 wherein
the converted title key has been generated as a result of a predetermined calculation performed on first concatenated data and the title key, the first concatenated data being obtained by concatenating the content signature generated by the authorized signature device and the usage condition, and
the title key reconstruction unit generates the reconstructed title key, by generating second concatenated data from the content signature read by the read unit and the usage condition, and performing an inverse calculation of the predetermined calculation on the second concatenated data and the converted title key.

4. The terminal device of claim 3 further comprising
a content signature verification unit configured to judge whether the content signature read by the read unit matches the content signature generated by the authorized signature device, and if judging negatively, to prevent processing by the playback unit.

5. The terminal device of claim 3 further comprising
a content verification unit configured to verify, with use of the content signature read by the read unit, whether the encrypted content is authorized, and if judging negatively, to prevent processing by the playback unit.

6. The terminal device of claim 3 wherein
the content signature read by the read unit includes an identification information piece for identifying a signature device that has generated the content signature, and
the terminal device further comprises:
a reception unit configured to receive a revocation list including one or more identification information pieces respectively identifying one or more devices that have been revoked; and
a revocation check unit configured to check whether the signature device has been revoked with use of the revocation list, and if judging affirmatively, to prevent processing by the playback unit.

7. The terminal device of claim 6 wherein
the content signature read by the read unit further includes a first date information piece indicating a date on which the content signature was generated by the signature device,
the revocation list further includes one or more second date information pieces associated one-to-one with the one or more identification information pieces respectively identifying the one or more revoked devices, each second date information piece indicating a date on which the corresponding device was revoked, and
the revocation check unit
judges that the signature device has been revoked if the identification information piece of the signature device is included in the revocation list and the date indicated by the first date information is the same as or more recent than the corresponding second identification piece, and
judges that the signature device has not been revoked if the identification information piece of the signature device is included in the revocation list and the date indicated by the first date information is older than the corresponding second identification piece.

8. A verification device comprising:
a read unit configured to read encrypted content and a content signature generated by an authorized signature device from a recording medium device, and to read a converted title key from a protected area of the recording medium device, the converted title key having been converted and calculated from a parameter of a title key with use of another parameter of the content signature generated by an authorized signature device with use of a content signature key, wherein a reconstructed title key can be subsequently generated as an authorized title key by reversely converting the converted title key with use of the parameter of said content signature; and
a content signature verification unit configured to judge whether the content signature read by the read unit matches the content signature generated by the authorized signature device.

9. A key distribution device comprising:
a content holding unit configured to hold therein encrypted content that is content encrypted with use of a title key;
a content signature holding unit configured to hold therein a content signature generated by an authorized signature device for verifying whether the encrypted content is authorized;
a title key holding unit configured to hold therein the title key;
a key generation unit configured to generate a converted title key by converting the title key with use of a parameter of the content signature, wherein a reconstructed title key can be subsequently generated as an authorized title key by reversely converting the converted title key with use of the parameter of said content signature; and
a recording unit configured to record the encrypted content, the content signature, and the converted title key into a recording medium device.

10. The key distribution device of claim 9 further comprising
a usage condition holding unit configured to hold therein a usage condition of the content, wherein
the key generation unit generates the converted title key from the content signature, the usage condition, and the title key.

11. The key distribution device of claim 10 wherein
the key generation unit generates the converted title key by performing a predetermined calculation on concatenated data and the title key, the concatenated data being obtained by concatenating the content signature and the usage condition.

12. A content playback method used in a terminal device, comprising the steps of:
reading encrypted content and a content signature from a recording medium device, and reading a converted title key from a protected area of the recording medium device, the converted title key having been converted and calculated from a parameter of a title key with use of another parameter of the content signature generated by an authorized signature device;
generating subsequently a reconstructed title key as an authorized title key by reversely converting the converted title key with use of the parameter of said content signature read by the read unit; and
decrypting the encrypted content with use of the reconstructed title key which is authorized to obtain decrypted content, and playing back the decrypted content.

13. A non-transitory computer-readable recording medium storing thereon a computer program used in a terminal device, the computer program causing the terminal device to perform the steps of:
reading encrypted content and a content signature from a recording medium device, and reading a converted title key from a protected area of the recording medium device, the converted title key having been converted and calculated from a parameter of a title key with use of another parameter of the content signature generated by an authorized signature device;
generating subsequently a reconstructed title key as an authorized title key by reversely converting the converted title key with use of the parameter of said content signature read by the read unit; and
decrypting the encrypted content with use of the reconstructed title key which is authorized to obtain decrypted content, and playing back the decrypted content.

14. A key distribution method used in a key distribution device, the key distribution device holding therein:
encrypted content that is content encrypted with use of a title key;
a content signature generated by an authorized signature device for verifying whether the encrypted content is authorized; and
the title key that encrypts said content, and
the key distribution method comprising the steps of:
generating a converted title key by converting the title key with use of a parameter of the content signature, wherein a reconstructed title key can be subsequently generated as an authorized title key by reversely converting the converted title key with use of the parameter of said content signature; and
recording the encrypted content, the content signature, and the converted title key into a recording medium device.

15. A non-transitory computer-readable recording medium storing thereon a computer program used in a key distribution device, the key distribution device holding therein:

encrypted content that is content encrypted with use of a title key;

a content signature generated by an authorized signature device for verifying whether the encrypted content is authorized; and the title key that encrypts said content, and the computer program causing the key distribution device to perform the steps of:

generating a converted title key by converting the title key with use of a parameter of the content signature, wherein a reconstructed title key can be subsequently generated as an authorized title key by reversely converting the converted title key with use of the parameter of said content signature; and recording the encrypted content, the content signature, and the converted title key into a recording medium device.

* * * * *